US012712107B2

(12) United States Patent
Harada et al.

(10) Patent No.: US 12,712,107 B2
(45) Date of Patent: Aug. 18, 2026

(54) APPARATUS FOR MANUFACTURING ROTOR

(71) Applicant: DENSO CORPORATION, Kariya-city (JP)

(72) Inventors: Masaru Harada, Kariya-city (JP); Ritsuro Hiramatsu, Kariya-city (JP); Toshihiro Uchida, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 256 days.

(21) Appl. No.: 18/606,050

(22) Filed: Mar. 15, 2024

(65) Prior Publication Data

US 2024/0221987 A1 Jul. 4, 2024

Related U.S. Application Data

(63) Continuation of application No. PCT/JP2022/032133, filed on Aug. 26, 2022.

(30) Foreign Application Priority Data

Sep. 16, 2021 (JP) ................................ 2021-151358

(51) Int. Cl.
*H01F 13/00* (2006.01)
*H02K 15/03* (2025.01)

(52) U.S. Cl.
CPC .......... *H01F 13/003* (2013.01); *H02K 15/03* (2013.01); *H02K 2215/00* (2021.08)

(58) Field of Classification Search
CPC .. H01F 13/003; H02K 15/03; H02K 2215/00; H02K 1/27; H02K 1/274; H02K 1/2766
See application file for complete search history.

(56) References Cited

U.S. PATENT DOCUMENTS

| | | | | |
|---|---|---|---|---|
| 2016/0111945 A1 | 4/2016 | Yamaguchi et al. | | |
| 2016/0359398 A1 | 12/2016 | Shibata | | |
| 2017/0279340 A1* | 9/2017 | Takeuchi | ............... | H02K 1/272 |

FOREIGN PATENT DOCUMENTS

| | | | | | |
|---|---|---|---|---|---|
| JP | 2007-035786 A | | 2/2007 | | |
| JP | 2012205397 A | * | 10/2012 | | |
| JP | 2013247782 A | * | 12/2013 | | |
| JP | 2014-121116 A | | 6/2014 | | |
| JP | 2014-183691 A | | 9/2014 | | |
| JP | 2016-082798 A | | 5/2016 | | |
| JP | 2016-144322 A | | 8/2016 | | |
| JP | 2017-005916 A | | 1/2017 | | |
| JP | 2017060240 A | * | 3/2017 | | |
| WO | WO-2018011850 A1 | * | 1/2018 | ............. | H02K 1/165 |

* cited by examiner

*Primary Examiner* — Mohamad A Musleh
(74) *Attorney, Agent, or Firm* — Oliff PLC

(57) ABSTRACT

A manufacturing apparatus of a rotor is for a rotor having a permanent magnet provided in a state of being embedded inside a rotor core, the permanent magnet having a folding shape being convex towards a radially inside part. The manufacturing apparatus includes a magnetization apparatus that magnetizes the permanent magnet in the embedded state from outside the rotor. The magnetization apparatus is provided with a yoke part at least disposed in an axially outside part of the rotor, the yoke part constituting a magnetic path for supplying a magnetization flux to the permanent magnet. The yoke part includes at least one of a dust core, a laminated steel plate, and a slit having a function of suppressing eddy current occurring due to the magnetization flux.

9 Claims, 14 Drawing Sheets

FIG.14

ENERGIZATION APPARATUS

FIG.16

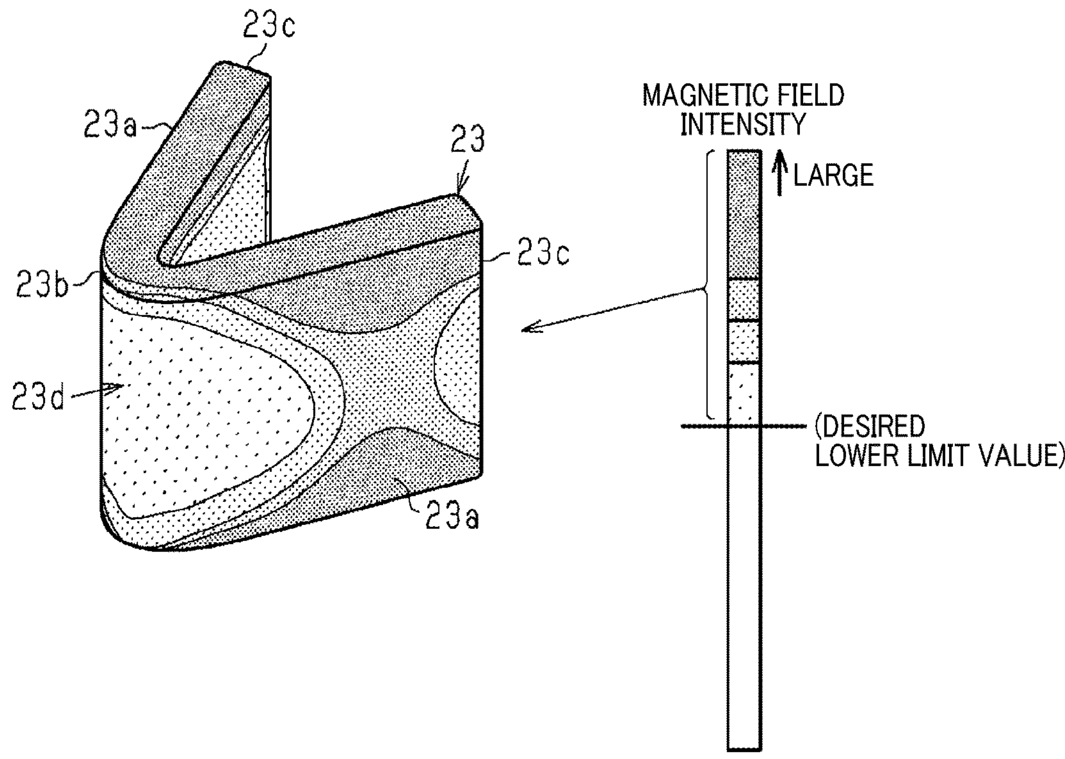

FIG.17

| | RADIALLY OUTSIDE MAIN YOKE PART | AUXILIARY YOKE PART |
|---|---|---|
| EMBODIMENT | LAMINATED STEEL PLATE + SLIT | DUST CORE |
| MODIFICATION EXAMPLE 1 | DUST CORE | STEEL MATERIAL + SLIT |
| MODIFICATION EXAMPLE 2 | STEEL MATERIAL + SLIT | LAMINATED STEEL PLATE |

FIG.18

| | VERTICAL MAGNETIZATION YOKE |
|---|---|
| EMBODIMENT | DUST CORE |
| MODIFICATION EXAMPLE 1 | STEEL MATERIAL + SLIT |
| MODIFICATION EXAMPLE 2 | LAMINATED STEEL PLATE |

APPARATUS FOR MANUFACTURING ROTOR

CROSS-REFERENCE OF RELATED APPLICATIONS

This application is the U.S. bypass application of International Application No. PCT/JP2022/032133 filed on Aug. 26, 2022, which designated the U.S. and claims priority to Japanese Patent Application No. 2021-151358 filed on Sep. 16, 2021, the contents of which is incorporated herein by reference.

BACKGROUND

Technical Field

The present disclosure relates to a manufacturing apparatus for a rotor, including external magnetization of a permanent magnet of a magnet embedded type rotor.

Description of the Related Art

Conventionally, a rotary electric machine using a magnet embedded type rotor (IPM type) is known. The magnet embedded type rotor is configured to include a permanent magnet embedded inside the rotor core and to obtain a reluctance torque at a radially outside portion relative to the permanent magnet in the rotor core. According to such a magnet embedded type rotor as described above, magnetization of the rotor may be accomplished such that a magnetization apparatus magnetizes, from radially outside, a rotor core having an unmagnetized permanent magnet embedded therein.

SUMMARY

A manufacturing apparatus of a rotor according to one aspect of the present disclosure is for a rotor having a permanent magnet provided in a state of being embedded in a magnet accommodating hole of a rotor core, the permanent magnet having a folding shape being convex towards a radially inside part. The manufacturing apparatus includes a magnetization apparatus that magnetizes the permanent magnet in the embedded state from outside the rotor. The magnetization apparatus is provided with a yoke part at least disposed in an axially outside part of the rotor, the yoke part constituting a magnetic path for supplying a magnetization flux to the permanent magnet. The yoke part is configured to include at least one of a dust core, a laminated steel plate, and a slit having a function of suppressing eddy current occurring due to the magnetization flux.

BRIEF DESCRIPTION OF THE DRAWINGS

The above-described objects and other objects, features and advantages of the present disclosure will be clarified further by the following detailed description with reference to the accompanying drawings. The drawings are:

FIG. 14 is an explanatory diagram showing an overall configuration of a magnetization apparatus according to the second embodiment;

FIG. 16 is an explanatory diagram showing a permanent magnet magnetized by the magnetization apparatus according to the first embodiment;

FIG. 17 is a table showing a configuration of a magnetization apparatus of a modification example; and FIG. 18 is a table showing a configuration of a magnetization apparatus of a modification example.

DETAILED DESCRIPTION OF THE PREFERRED EMBODIMENTS

Conventionally, a rotary electric machine using a magnet embedded type rotor (IPM type) is known. For example, Japanese Patent Application Laid-Open Publication No. 2016-144322 discloses a magnet embedded type rotor configured to include a permanent magnet embedded inside the rotor core and to obtain a reluctance torque at a radially outside portion relative to the permanent magnet in the rotor core. According to such a magnet embedded type rotor as described above, magnetization of the rotor may be accomplished such that a magnetization apparatus magnetizes, from radially outside, a rotor core having an unmagnetized permanent magnet embedded therein.

In order to make the magnet embedded type rotor more sophisticated, as one of countermeasures, the permanent magnet may be configured to have a substantially V or U folded shape to form a radially outside portion larger than that of the permanent magnet in the rotor core, thereby increasing the reluctance torque.

However, in the case where the radially outside portion is designed to be larger than the permanent magnet in the rotor core, when setting a bending portion as a folding part of the permanent magnet to be a deep-folding shape where the bending portion is positioned at a more radially inside portion, the bending portion and its periphery of the permanent magnet is positioned to be apart from the magnetization apparatus. Hence, there is a concern that the bending portion and its periphery positioned apart from the magnetization apparatus may not be sufficiently magnetized.

Further, since a large magnetic flux flows on the magnetic path of the magnetization apparatus during the magnetization, a problem arises that heat will be generated in a portion constituting the magnetic path of the magnetization apparatus due to eddy current produced around the magnetic flux. When the magnetization apparatus is in a high temperature condition, magnetization may be difficult to maintain.

First Embodiment

Figure 1:
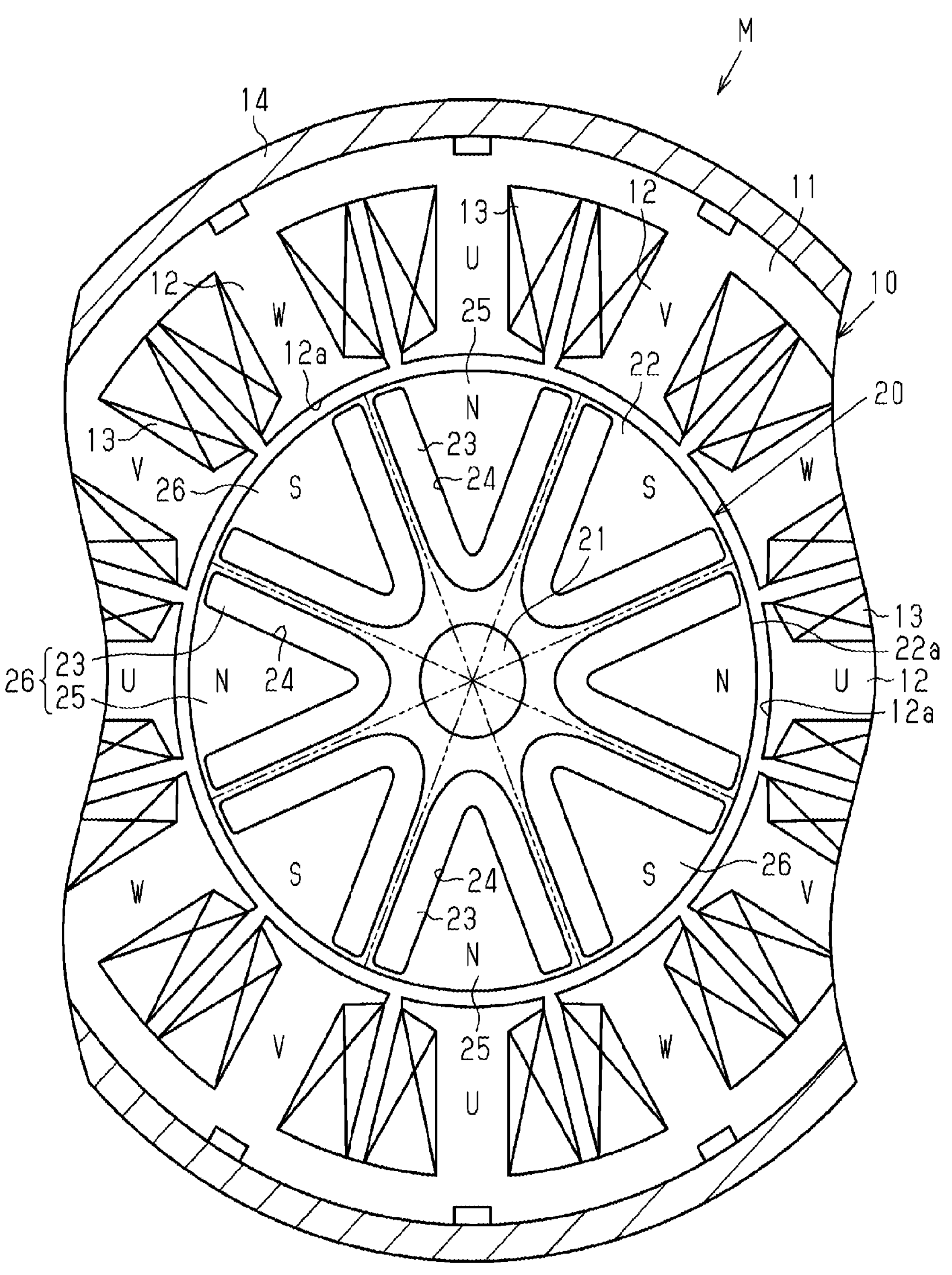
FIG. 1 is a diagram showing a configuration of a rotary electric machine having a magnet embedded type rotor to which magnetization apparatuses of respective embodiments magnetize.

Hereinafter, a first embodiment applied to a manufacturing apparatus of a rotor will be described. A rotary electric machine M of the present embodiment shown in FIG. 1 is configured as a magnet embedded type brushless-motor. The rotary electric machine M is provided with a stator 10 having substantially ring-shape and a rotor 20 having substantially cylindrical shape rotatably provided in a radially inside portion of the stator 10.

The stator 10 is provided with a stator core 11 having substantially ring-shape. The stator core 11 is made of a metal magnetic material. For example, the stator core 11 is composed of a plurality of electromagnetic steel sheet laminated in the axial direction. The stator core 11 includes twelve teeth 12 according to the present embodiment, extending towards radially inside and arranged in the circumferential direction at the same intervals. The respective teeth 12 have mutually the same shape. A tip end portion of the teeth 12 at an end portion in the radially inside has substantially T shape. A tip end surface 12*a* of the teeth 12 has an arc shape along the outer peripheral surface of the rotor 20. A winding 13 is wound around the teeth 12 with a concentrated winding. The winding 13 is connected to form a three-phase winding. As shown in FIG. 1, the three-phase winding serves as U-phase, V-phase and W phase. When the power is supplied to the winding 13, a rotating magnetic field is produced at the stator 10 for rotatably driving the rotor 20. For such the stator 10, an outer peripheral surface of the stator core 11 is fixed to the inner peripheral surface of the housing 14.

The rotor 20 is provided with a rotational shaft 21, a rotor core 22 having substantially cylindrical shape to which the rotational shaft 21 is fitted into the center portion and eight permanent magnets 23 according to the present embodiment which are embedded inside the rotor core 22. The rotor core 22 is made of metal magnetic material. The rotor core 22 is composed of, for example, a plurality of electromagnetic steel sheet laminated in the axial direction. For the rotor 20, the rotational shaft 21 is supported by a bearing (not shown) provided in the housing 14, whereby the rotor 20 is rotatably provided to the stator 10.

The rotor core 22 includes a magnet accommodating hole 24 for accommodating the permanent magnets 23. For the magnet accommodating hole 24, eight magnet accommodating holes 24 are provided in the rotor core 22 at the same interval in the circumferential direction. Each of the magnet accommodating holes 24 has a substantially V folding shape being convex towards a radially inside part. The respective magnetic accommodating holes 24 have mutually the same shape. Also, the magnet accommodating holes 24 are provided at the rotor core 22 entirely in the axial direction thereof.

Here, the permanent magnets 23 according to the present embodiment are composed of bond magnet in which a magnet material composed of magnet powder and a resin are mixed, is molded and solidified. In other words, the magnet accommodating holes 24 of the rotor core 22 are formed as a result of molding the permanent magnets 23. In the case where the magnet material is filled inside the magnet accommodating holes 24 with an injection molding, and then the magnet material inside the material accommodating holes 24 are solidified, thereby forming the permanent magnets 23. Therefore, the hole shape of the magnet accommodating holes 24 is an outline shape of the permanent magnet 23. As the magnet power used for the permanent magnet 23 according to the present embodiment, samarium-iron nitrogen magnet is used, for example. However, other rare-earth magnets may be used.

Figure 2:
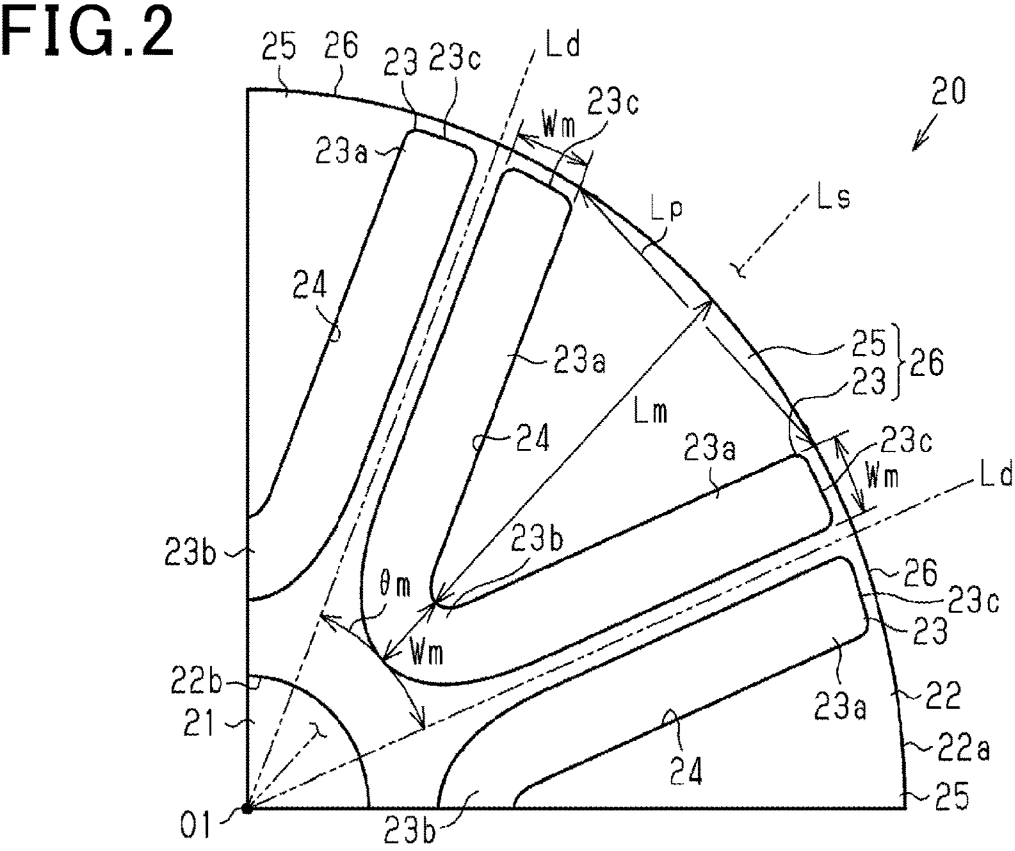
FIG. 2 is a diagram showing a configuration of the rotor to which magnetization apparatuses of respective embodiments magnetize.

The permanent magnet 23 configured as being embedded has a substantially V folding shape being convex towards radially inside part. In more detail, as shown in FIG. 2, each permanent magnet has a shape in which end portions in radially inside of a pair of straight parts 23*a* are connected by a bending portion 23*b*. The end portions 23*c* in radially outside of the straight part 23*a* are positioned close to the outer peripheral surface 22*a* of the rotor core 22. The thickness Wm of the permanent magnet 23 is constant through the V-shaped path including the pair of straight parts 23*a* and the bending portion 23*b*. The permanent magnet 23 has a line-symmetrical shape with respect to a circumferential center line Ls passing through the axial center O1 of the rotor 20. Each of the adjacently positioned permanent magnets 23 is close to the magnet pole boundary line Ld passing through the axial center O1 of the rotor 20 positioned between adjacently positioned permanent magnets 23. An angle formed between adjacent magnet pole boundary lines Ld, that is, a magnet pole open angle θm of the rotor magnet pole part 26 including the permanent magnet 23 is 180° degree in the electrical angle.

Figure 3:
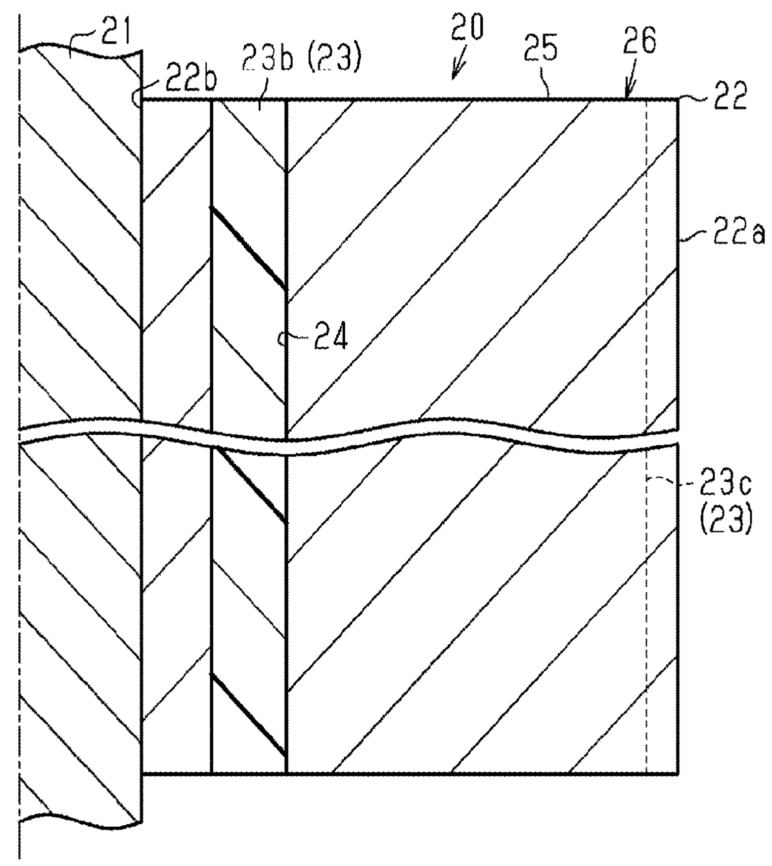
FIG. 3 is a diagram showing a cross-sectional view of an example of a rotor to which a magnetization apparatus of a first embodiment magnetizes.

Here, a magnet pole pitch Lp is defined as a distance on the outer peripheral surface 22*a* of the rotor core 22 between extending lines extending from inner side surfaces of respective straight parts 23*a* of the permanent magnet 23 and an embedded depth Lm is defined as a distance on a center line Ls of the circumferential direction of the permanent magnet 23 from the outer peripheral surface 22*a* of the rotor core 22 to the inner side surface of the bending portion 23*b* of the permanent magnet 23. For the permanent magnet 23 according to the present embodiment, a configuration of a deep folding shape is utilized in which embedded depth Lm is larger than the magnet pole pitch Lp. In other words, as shown in FIGS. 2 and 3, the permanent magnet 23 according to the present embodiment has a deep folding shape in which the own bending portion 23*b* is positioned in a radially inside which is close to a shaft insertion hole 22*b* of the center part of the rotor core 22 to which the rotational shaft 21 is inserted. Further, the permanent magnets 23 are provided at the rotor core 22 entirely in the axial direction thereof.

Figure 4:
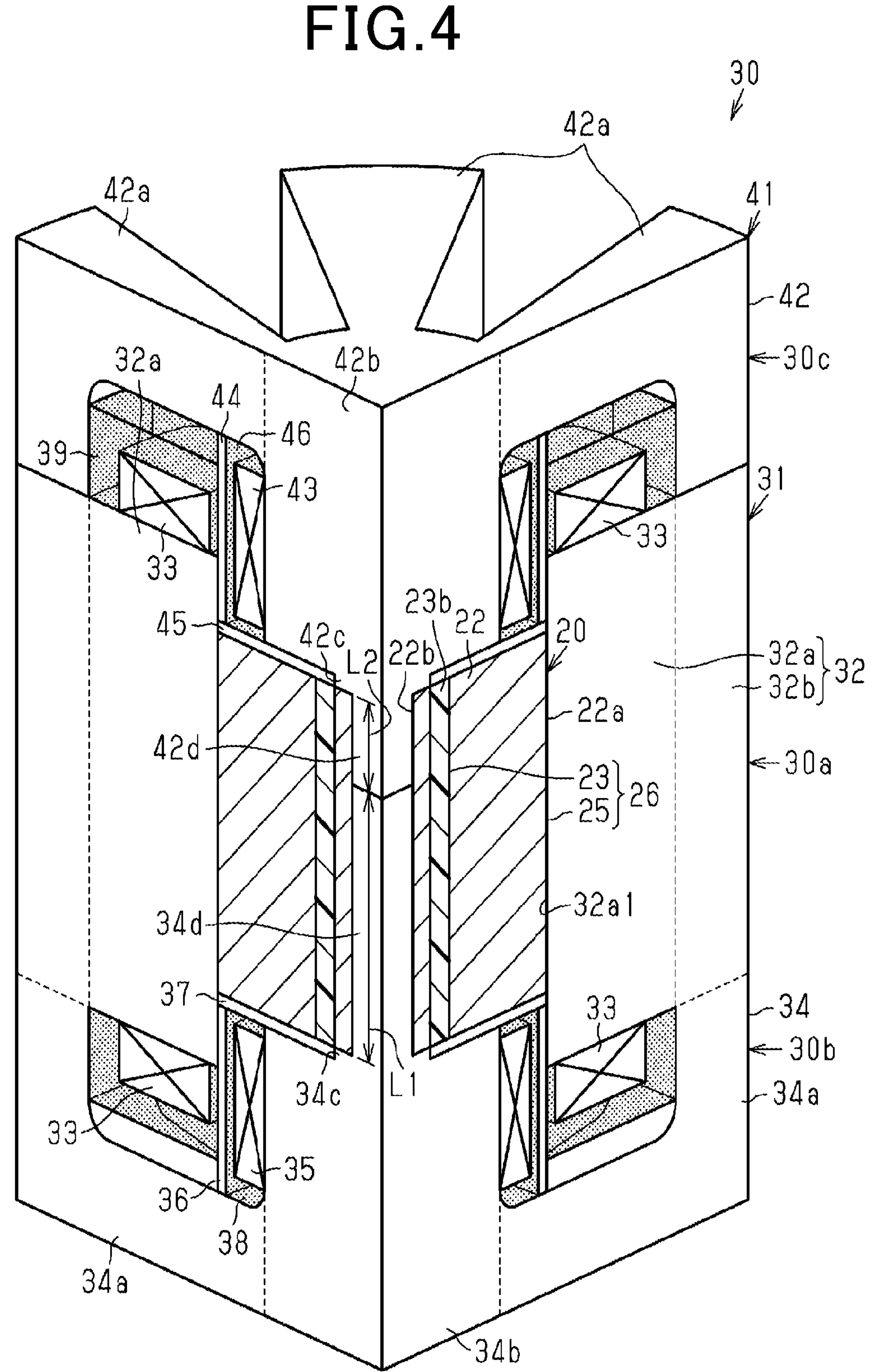
FIG. 4 is an explanatory diagram illustrating a configuration of a magnetization apparatus according to the first embodiment.

For the permanent magnet 23 solidified in the magnet accommodating hole 24 of the rotor core 22, a magnetization apparatus 30 shown in FIG. 4 and the like is utilized to perform a magnetization of the permanent magnet from outside the rotor core 22 so as to have the un-magnetized magnet function as a magnet. For the magnetization apparatus 30 and a method for the magnetization using the magnetization apparatus 30 will be described later in detail. According to the present embodiment, eight permanent magnets 23 are provided in the circumferential direction of the rotor core 22, which are magnetized alternately in the circumferential direction to be different polarities. Each permanent magnet 23 is magnetized in its thickness direction.

In the rotor core 22, a portion facing the stator 10 in a radially outside relative to the permanent magnet 23 functions as an outer side core part 25 in order to obtain a reluctance torque. Then, the rotor 20 is configured as an eight-poles rotor magnet pole parts 26, including the permanent magnets 23 and an outer side core part 25 surrounded by V-shaped part of each permanent magnet 23. The respective magnetic pole parts 26 function as N pole and S pole alternately in the circumferential direction shown in FIG. 1. According to the rotor 20 having such the rotor magnetic pole parts 26, a magnet torque and a reluctance may preferably be obtained. Note that the shape of the above-described permanent magnet 23 is an example and may appropriately be modified. Also, the configuration of the rotary electric machine M may appropriately be modified.

Next, a configuration of the magnetization apparatus 30 and a magnetization method will be described.

[Configuration of Magnetization Apparatus]

With reference to FIGS. 4 to 7, a magnetization apparatus 30 according to the present embodiment will be described. In FIGS. 4 to 7, hatching is appropriately omitted for a cross-sectional part. Also, in FIG. 6, the rotor 20 is shown as a cross-sectional view and the end face of the magnetization apparatus 30 is shown.

The magnetization apparatus 30 is provided with an apparatus body 31 and an apparatus upper side part 41. The magnetization apparatus 30 is configured such that the apparatus upper side part 41 is detachable and attachable to the apparatus body 31 so as to allow the rotor 20 as a magnetization object to be installed or removed. Note that an arrangement of the apparatus body 31 and the apparatus upper side part 41 and an operation mode thereof are one example only, and may be appropriately modified.

The apparatus body 31 is provided with a main magnetization part 30*a* and a lower side auxiliary magnetization part 30*b* which are integrated. The main magnetization part 30*a* is provided with a radially-outside main yoke 32 made of magnetic metal and a magnetization main coil 33. The radially-outside main yoke 32 includes eight magnetization opposing convex parts 32*a* provided corresponding to respective rotor magnet pole parts 26 of the rotor 30 installed at the magnetization apparatus 30. A tip end surface 32*al* as a radially inside end part of respective magnetization opposing convex parts 32*a* has a positional relationship with the outer peripheral surface 22*a* of the rotor 20 (rotor core 22) such that the tip end surface 32*al* is positioned much closely opposing the outer peripheral surface 22*a*. The magnetization main coil 33 is wound around each of the magnetization opposing convex parts 32*a* such that each winding axis is in the radial direction. A periphery of the magnetization main coil 33 is covered by a coil supporting part 39 made of thermo-setting resin such as an epoxy resin fixed therein. The coil supporting part 39 is utilized to restrict the shape thereof, thereby avoiding deformation of the magnetization main coil 33 when being energized, or a loosening of the winding. Further, according to the coil supporting part 38, heat produced when energized can be absorbed from the magnetization main coil 33 and the magnetization main coil 33 can be protected when being assembled. An outer periphery part in the radial direction of the radially-outside main yoke 32 serves as an annular coupling part 32*b* that integrally couples respective magnetization opposing convex parts 32*a* in the circumferential direction which are provided at the same interval in the circumferential direction (see FIG. 7).

The lower auxiliary magnetization part 30*b* is provided with a lower side auxiliary yoke 34 made of magnetic metal material and a magnetization lower side auxiliary coil 35. The lower side auxiliary yoke 34 is provided with eight lower side coupling parts 34*a* provided corresponding to respective magnetization opposing convex parts 32*a* and one lower side collection parts 34*b* that collects respective lower side coupling parts 34*a*. For each lower side coupling part 34*a*, one end is integrally coupled to the lower surface part of the annular coupling part 32*b* of the radially outer side main yoke 32. Each lower side coupling part 34*a* has a shape which makes a detour in an axially lower side avoiding the magnetization main coil 33 and the like. The other end of each of the lower side coupling portions 34*a* integrally couples each lower side collection part 34*b*.

The lower side collection part 34*b* is positioned in a lower side of the rotor 20 disposed in the magnetization apparatus 30. The lower side collection part 34*b* has a column shape along the axial direction of the rotor 20. The lower side collection part 34*b* includes a contact part 34*c* and a lower side insertion protrusion 34*d*. The contact part 34*c* allows the rotor 20 to be placed at a center portion on the upper surface of the contact part 34*c* and contact therewith. The lower side insertion protrusion 34*d* is inserted, inside the contact part 34*c*, into the shaft insertion hole 22*b* of the center part of the rotor core 22 from the lower side. A protruded length L1 of the lower side insertion protrusion 34*d* is longer than a protruded length L2 of an upper side insertion protrusion 42*d* which will be described later.

Further, the magnetization lower side auxiliary coil 35 is wound around the lower side collection part 34*b* such that the winding axis is in the axial direction. In the outer periphery side of the magnetization lower side auxiliary coil 35, a lower side first restriction member 36 made of non-magnetic metal having a cylindrical shape is attached. In the upper side of the magnetization lower side auxiliary coil 35 in the axial direction, a lower side second restriction member 37 made of non-magnetic metal having a plate shape is fixed to the lower side collection part 34*b* and the like. The upper side surfaces of the lower side second restriction member 37 and the contact part 34*c* are made flush with each other, for example. The respective restriction members 36 and 37 are made of SUS for example. Further, inside the respective restriction members 36, and 37, a periphery of the magnetization lower side auxiliary coil 35 is covered by a coil supporting part 38 made of thermo-setting resin such as an epoxy resin fixed therein. The coil supporting member 38 operates together with the respective restriction members 36 and 37, so as to restrict the shape thereof, thereby avoiding deformation or loosening of the winding of the magnetization lower side auxiliary coil 35 when being energized. Further, according to the coil supporting part 38, a heat produced when being energized can be absorbed from the magnetization lower side auxiliary coil 35 and the magnetization lower side auxiliary coil 35 can be protected when being assembled.

On the other hand, the apparatus upper side part 41 which contacts or separates to/from the apparatus body 31 is provided with an upper side auxiliary magnetization part 30*c* only. The upper side auxiliary magnetization part 30*c* is provided with an upper side auxiliary yoke 42 and a magnetizing upper side auxiliary coil 43. The upper side auxiliary yoke 42 is symmetrical with the lower side auxiliary yoke 34 in the vertical direction. The upper auxiliary yoke 42 is provided with eight upper side coupling parts 42*a* provided corresponding to respective magnetization opposing convex parts 32*a* and one upper side collection parts 42*b* that collects respective upper side coupling parts 42*a*. Each upper side coupling part 42*a* is configured such that one end thereof is capable of contacting with the upper surface part of the annular coupling part 32*b* of the radially-outside main yoke 32. Each upper side coupling part 42*a* has a shape which makes a detour in an axially upper side avoiding the magnetization main coil 33 and the like. The other end of each of the upper side coupling parts 42*a* integrally couples each upper side collection part 42*a*. The upper side auxiliary yoke 42 is configured such that respective upper side coupling parts 42*a* are coupled to the upper side collection part 42*b* to form an integrated configuration.

The upper side collection part 42*b* is positioned in an upper side of the rotor 20 provided in the magnetization apparatus 30. The upper side collection part 42*b* has a column shape along the axial direction of the rotor 20. The upper side collection part 42*b* includes a contact part 42*c* and an upper side insertion protrusion 42*d*. The contact part 42*c* allows the rotor 20 to contact with the center portion on the lower surface of the contact part 42*c*. The upper side insertion protrusion 42*d* is inserted, inside the contact part 42*c*, into the shaft insertion hole 22*b* of the center part of the rotor 20 from the upper side. A protruded length L2 of the upper side insertion protrusion 42*d* is shorter than a protruded length L1 of a lower side insertion protrusion 34*d* which will be described later as described above.

Further, the magnetization upper side auxiliary coil 43 is wound around the upper side collection part 42*b* such that the winding axis is in the axial direction. In the outer periphery side of the magnetization upper side auxiliary coil 43, an upper side first restriction member 44 made of non-magnetic metal having a cylindrical shape is attached. In the lower side of the magnetization upper side auxiliary coil 43 in the axial direction, a upper side second restriction member 45 made of non-magnetic metal having a plate shape is fixed to the upper side collection part 42*b* and the like. The lower side surfaces of the upper side second restriction member 45 and the contact part 42*c* are made flush with each other, for example. The respective restriction members 44 and 45 are made of SUS for example. Further, inside the respective restriction members 44, and 45, a periphery of the magnetization upper side auxiliary coil 43 is covered by a coil supporting part 46 made of thermosetting resin such as an epoxy resin fixed therein. The coil supporting member 46 operates together with the respective restriction members 44 and 45, so as to restrict the shape thereof, thereby avoiding a deformation or a loosening of the winding of the magnetization upper side auxiliary coil 43 when being energized. Further, according to the coil supporting part 38, a heat produced when being energized can be absorbed from the magnetization lower side auxiliary coil 35 and the magnetization lower side auxiliary coil 43 can be protected when being assembled.

According to such the magnetization apparatus 30 of the present embodiment performs, as a magnetization operation of the main magnetization part 30*a*, a magnetization that causes to flow a magnetization flux between magnetization opposing convex parts 32*a* adjacently positioned in the circumferential direction via an inside portion of the rotor 20. Moreover, the main magnetization part 30*a* and respective auxiliary magnetization parts 30*b* and 30*c* cooperatively operate to perform magnetization that forcibly causes the magnetization flux to flow through a radially inside part of the rotor 20 which is unlikely to be magnetized only with the main magnetization part 30*a*. In other words, the magnetization apparatus 30 of the present embodiment is capable of effectively magnetizing the bending part 23*b* and its periphery positioned at radially inside part which is away from the main magnetization part 30*a* of the permanent magnet 23.

[Magnetization Method Using Magnetization Apparatus]

The magnetization apparatus 30 configured as described above is utilized. Firstly, the rotor 20 having un-magnetized permanent magnet 23 is installed at the magnetization apparatus 30. Also, the rotational shaft 21 of an object rotor 20 to be magnetized is not yet inserted, and the shaft insertion hole 22*b* is opened.

Figure 6:
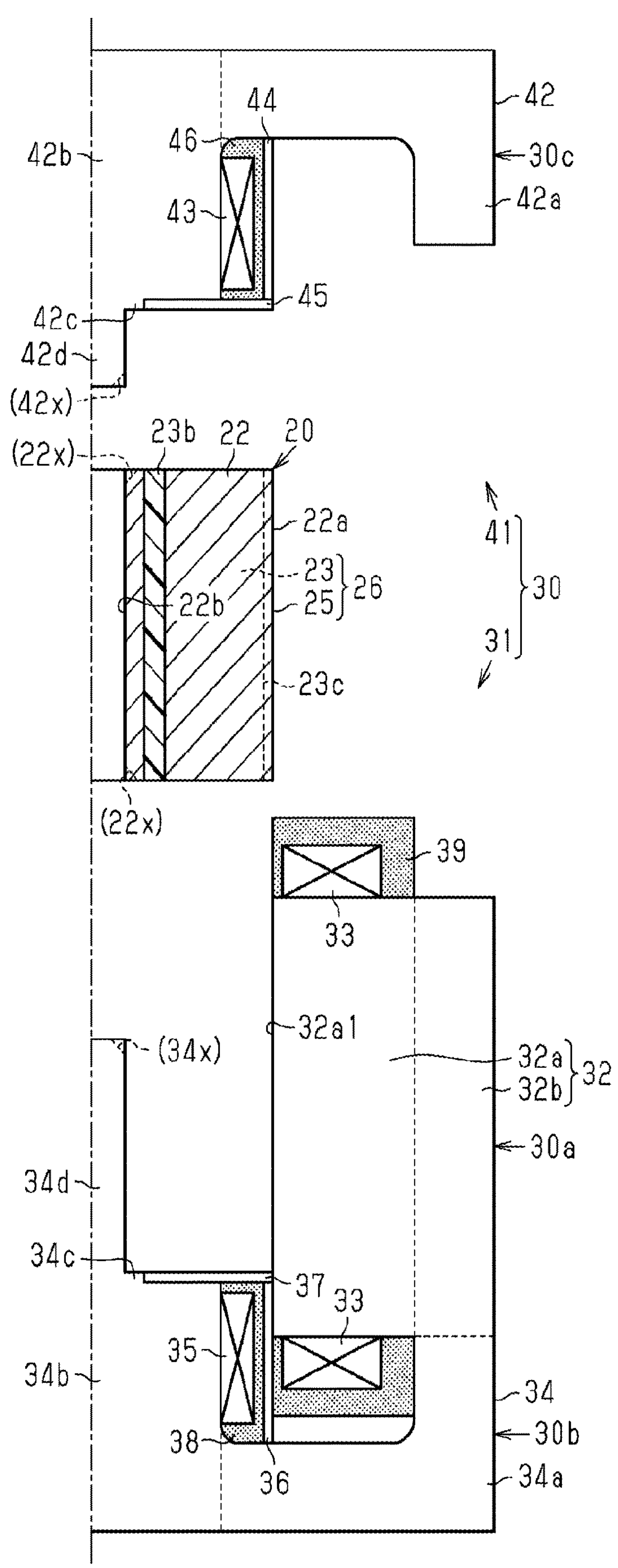
FIG. 6 is an explanatory diagram illustrating a configuration of the magnetization apparatus according to the first embodiment.
Figure 7:
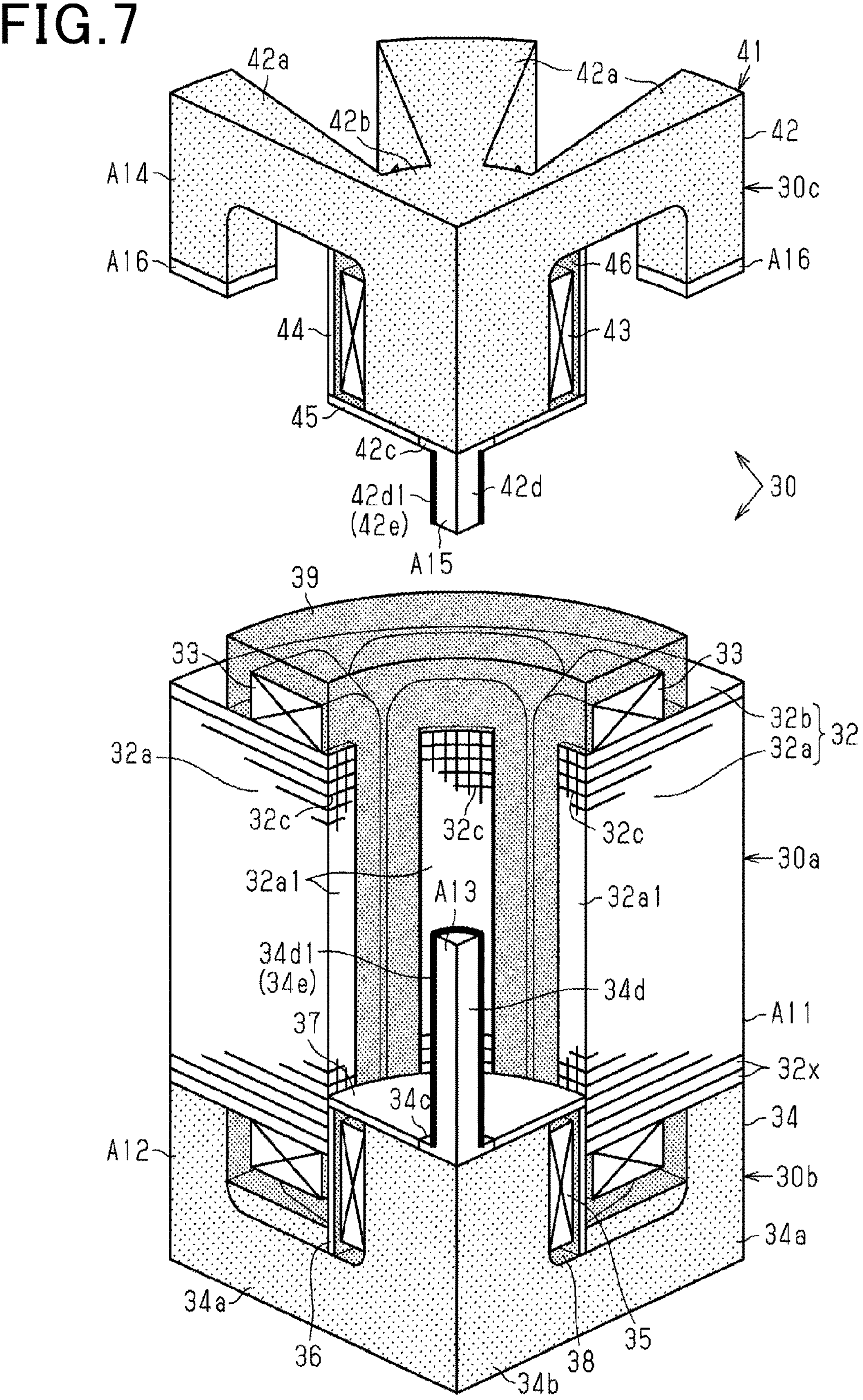
FIG. 7 is an explanatory diagram illustrating a configuration of the magnetization apparatus according to the first embodiment.

As shown in FIGS. 6 and 7, in a state where the apparatus upper side part 41 is made to be upwardly apart from the apparatus body 31, the rotor 23 having the un-magnetized permanent magnet 23 is placed on an upper surface part of the lower side collection part 34*b*. At this moment, the lower side insertion protrusion 34*d* is inserted into the shaft insertion hole 22*b* of the rotor 20. Since the lower side insertion protrusion 34*d* is configured to be longer, the rotor 20 is stably supported by the insertion of the lower side insertion protrusion 34*d*. Moreover, the upper side insertion protrusion 42*d* of the apparatus upper side part 41 is configured to be shorter and is unlikely to contact with peripheral parts thereof, and the apparatus upper side part 41 is likely to move.

Figure 5:
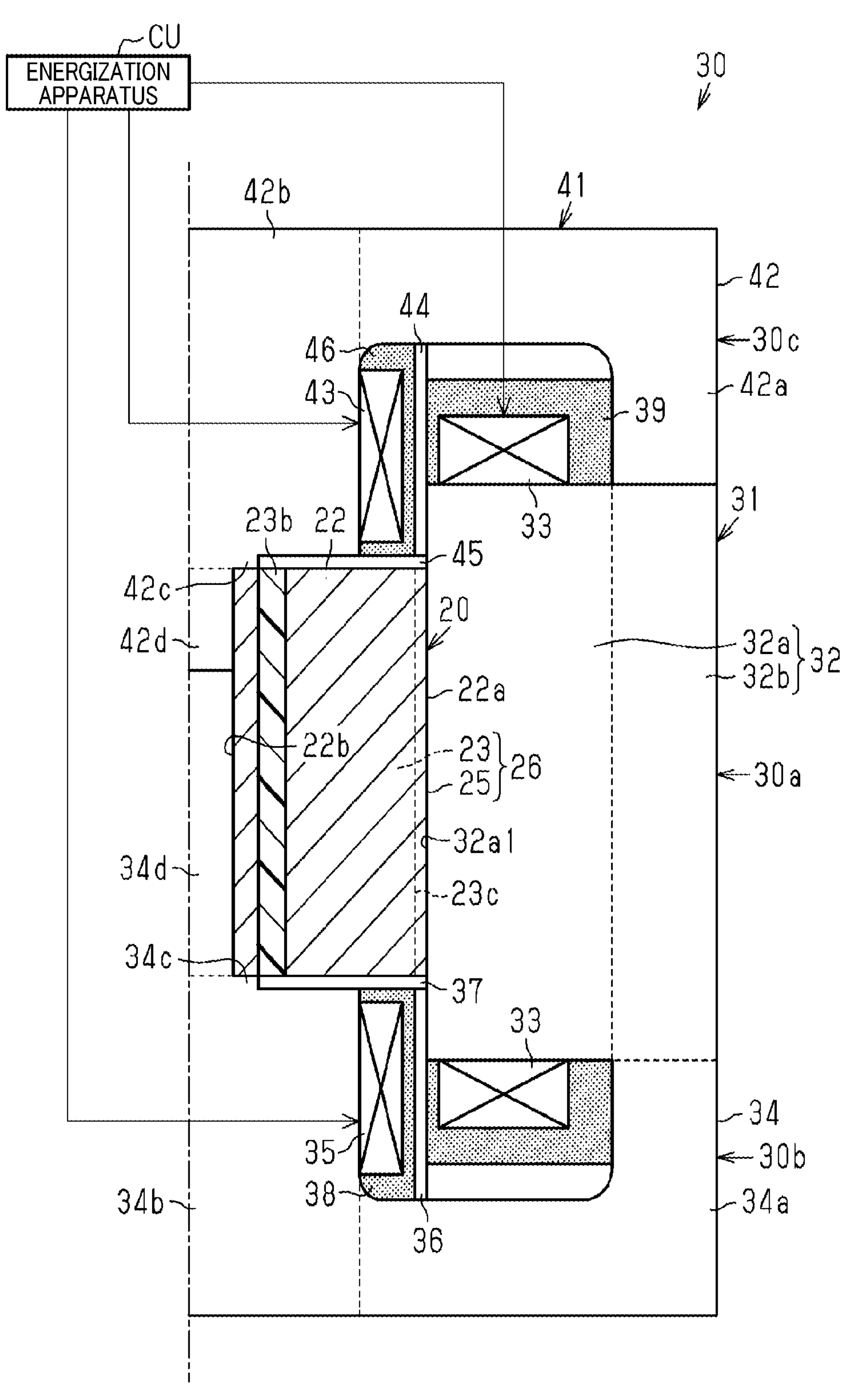
FIG. 5 is an explanatory diagram illustrating a configuration of the magnetization apparatus according to the first embodiment.

When the rotor 20 is mounted to the apparatus body 31, as shown in FIGS. 4 and 5, the apparatus upper side part 41 is lowered down in the axial direction, and the upper side insertion protrusion 42*d* is inserted into the axis insertion hole 22*b*. The apparatus upper side part 41 continues to be lowered down until one end of the upper side coupling part 42*a* of the upper side auxiliary yoke 42 comes into contact with the upper surface of the radially-outside main yoke 32. That is, the upper side auxiliary yoke 42 and the radially-outside main yoke 32 are magnetically connected, whereby magnetization flux smoothly flows between the upper side auxiliary yoke 42 and the radially-outer side main yoke 32

Next, according to the present embodiment, 2 step magnetization processes are applied to the permanent magnet 23 of the rotor 20. According to the present embodiment, firstly magnetization is applied to S pole magnet and then the magnetization is applied to N pole magnet. The order of magnetization is an example, and a reverse order of the magnetization may be applied.

Figure 8:
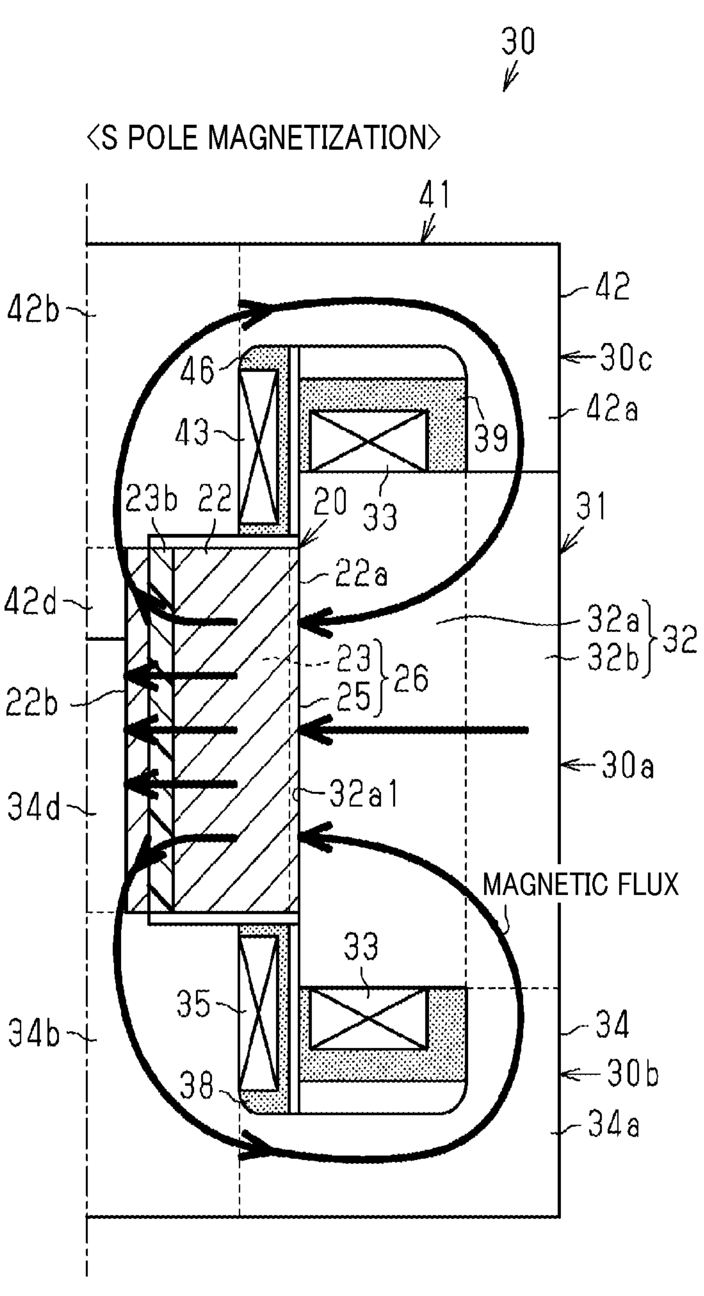
FIG. 8 is an explanatory diagram illustrating a magnetization method performed by the magnetization apparatus according to the first embodiment.

In the case of S-pole magnetization, magnetization is applied to alternate S-pole permanent magnets 23 to be magnetized among eight un-magnetized permanent magnets 23 to be arranged for the rotor 20 in the circumferential direction. In other words, an energization apparatus CU shown in FIG. 5 energizes the magnetization main coil 33 attached to alternate magnetization opposing convex parts 32*a* in the circumferential direction and the auxiliary coils 35 and 43 thereof for S-pole magnetization. Then, as shown in FIG. 8, in the rotor 20, magnetization flux is caused to flow from respective magnetization opposing convex part 32*a* of the radially-outside main yoke 32 towards respective insertion protrusions 34*d* and 42*d*.

At this moment, since the respective magnetization opposing convex part 32*a* and the respective insertion protrusions 34*d* and 42*d*, which are magnetically coupled with each other, oppose to each other between the radially-outside and the radially inside of the rotor 20, the magnetization flux increases which flows inside the rotor 20 from radially outside part to the radially inside part of the rotor 20. Further, the auxiliary coils 35 and 43 cooperatively operate with magnetization main coil 33 to be energized. Hence, magnetization force can be applied to the flow of the magnetization flux, whereby optimized magnetic flux can be effectively maintained.

Figure 9:
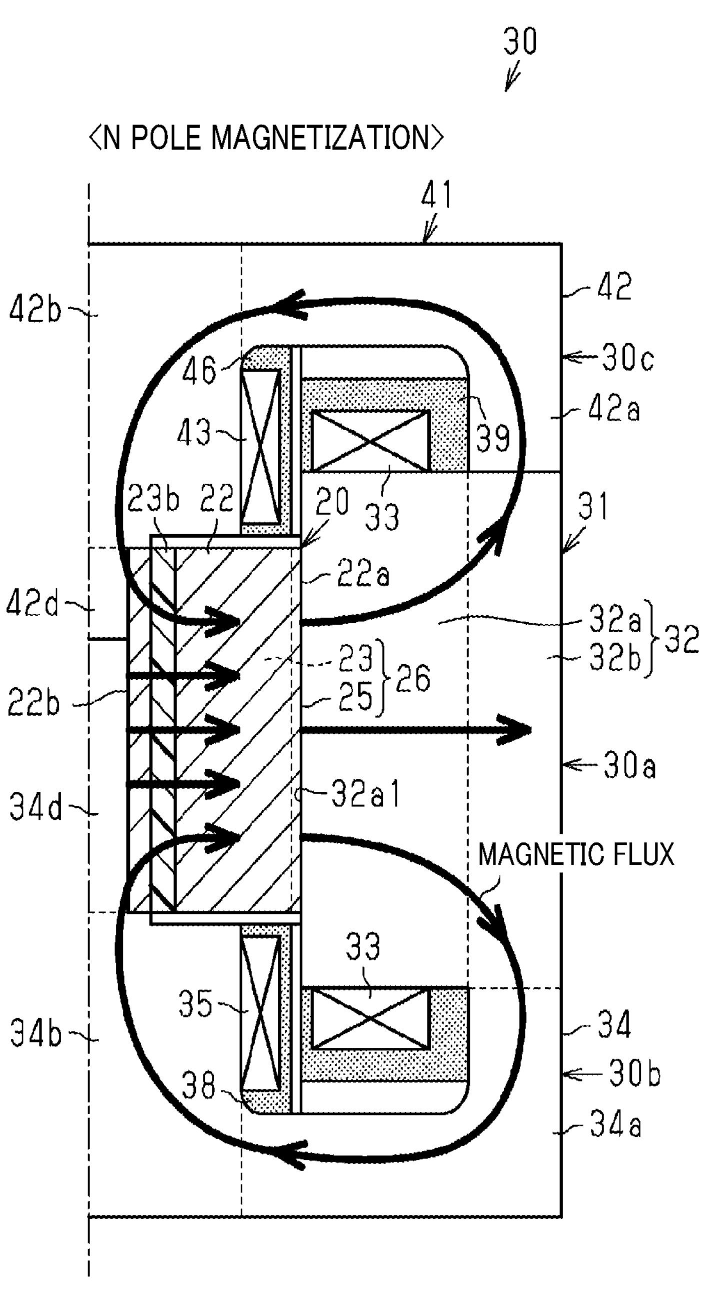
FIG. 9 is an explanatory diagram illustrating a magnetization method performed by the magnetization apparatus according to the first embodiment.

In the case of N-pole magnetization, magnetization is applied to remaining alternate N-pole permanent magnets 23 of the rotor 20 to be magnetized. In other words, the energization apparatus CU energizes the magnetization main coil 33 attached to alternate magnetization opposing convex parts 32*a* in the circumferential direction and the auxiliary coils 35 and 43 thereof for N-pole magnetization which is opposite to the S-pole magnetization. Then, as shown in FIG. 9, in the rotor 20, the magnetization flux which is opposite to the S-pole magnetization is caused to flow from the respective insertion protrusions 34*d* and 42*d* of the respective auxiliary yokes 34 and 42 towards respective magnetization opposing convex part 32*a* of the radially-outside main yoke 32.

Also in this case, since the respective magnetization opposing convex part 32*a* and the respective insertion protrusions 34*d* and 42*d*, which are magnetically coupled with each other, oppose to each other with respect the radial direction, the magnetization flux increases which flows inside the rotor 20 entirely from radially inside part to the radially outside part of the rotor 20. Similarly, the auxiliary coils 35 and 43 cooperatively operate with magnetization main coil 33 to be energized. Hence, the flow of the magnetization flux is significantly enhanced also for the N-pole magnets, whereby optimized magnetic flux can be effectively maintained.

Accordingly, similar to the permanent magnet 23 having a substantially V folding shape, even when the bending portion 23*b* as a folding part is positioned close to the radially-inside part, magnetization for the bending portion 23*b* and its periphery positioned away from the main magnetization part 30*a* can be effectively performed. In particular, this is more useful for a case of a deep folding shape where the embedded depth Lm becomes larger than the magnet pole pitch Lp like the permanent magnet 34 according to the present embodiment.

According to a conventional magnetization method, assuming that a main magnetization part 30*a* in the radially outer side of the present disclosure is used without auxiliary magnetization parts 30*b* and 30*c*, since the magnetization force for applying to the magnetization flux flowing through the radially inside part of the rotor 20 is weak, the bending part 23*b* and its periphery of the permanent magnet 23 becomes weak too. Especially, in the case of utilizing the deep folding shape like the permanent magnet 23 of the present embodiment, magnetic force at the bending part 23*b* and its periphery is likely to be weak. Further, as shown in FIG. 10, the magnetic force at a center part 23*d* in the vertical direction of the bending portion 23*b* of the permanent magnet 23 is the most unlikely to be weak.

Figure 10:
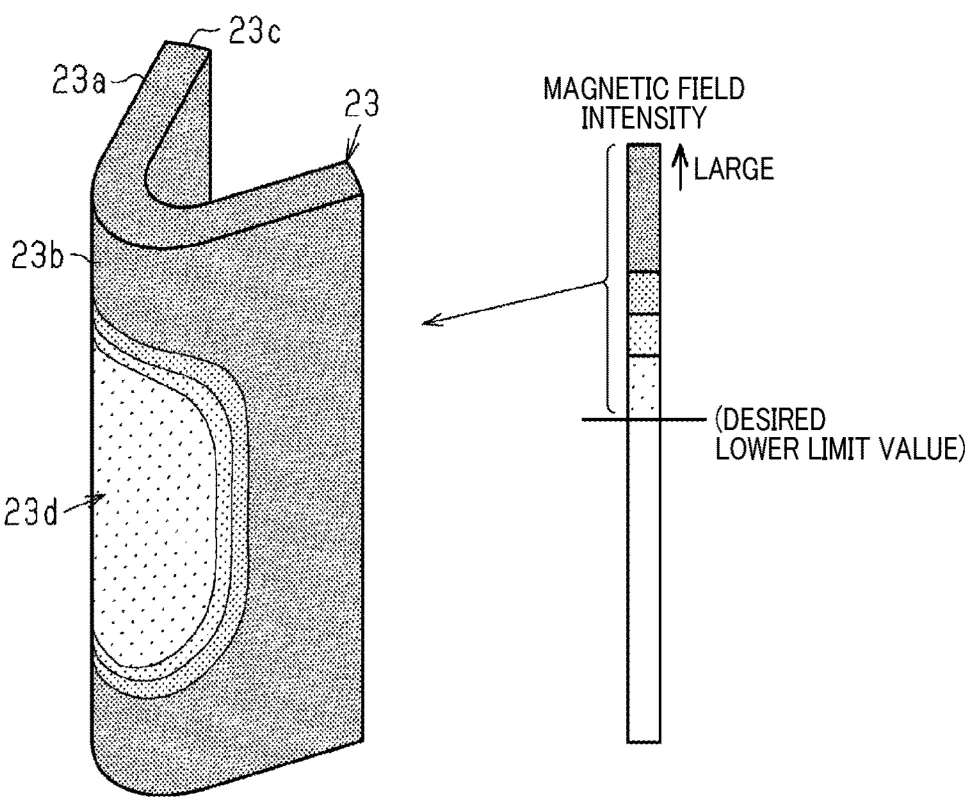
FIG. 10 is an explanatory diagram showing a permanent magnet magnetized by the magnetization apparatus according to the first embodiment.
Figure 11:
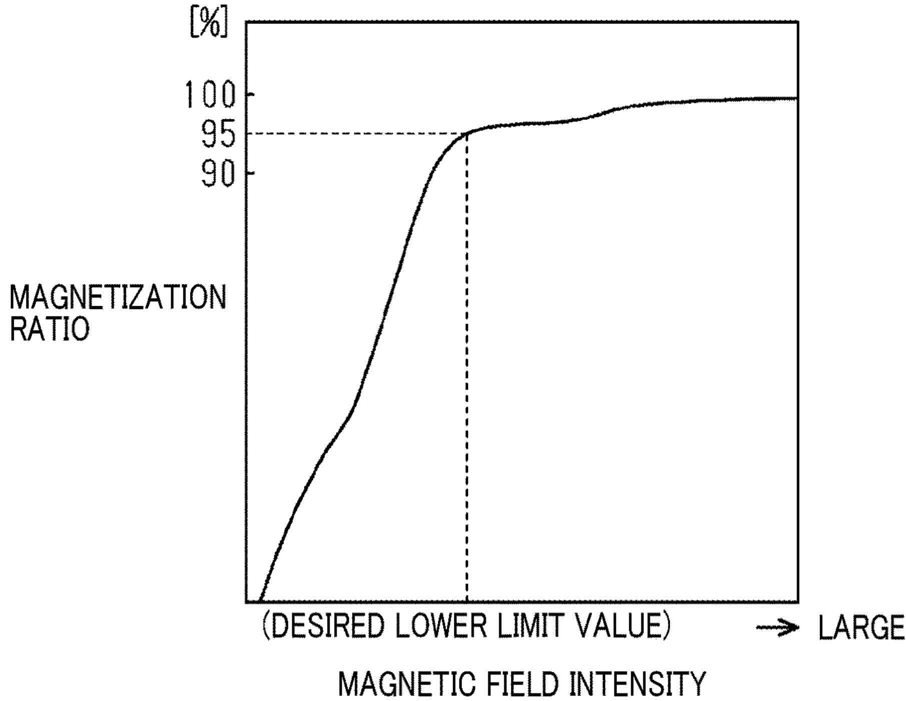
FIG. 11 is an explanatory diagram showing a permanent magnet magnetized by the magnetization apparatus according to the first embodiment.

However, when using the magnetization method according to the present embodiment, as shown in FIG. 10, also in the center part 23 in the vertical direction of the bending part 23*b* of the permanent magnet which may be a matter of concern, the magnetization can be performed with a magnetic field intensity larger than a desired lower limit value. The magnetization can be applied to the upper side part and the lower side part with respect to the center part 23*d* in the vertical direction of the bending part 23*b* and the straight part 23*a* with a sufficient magnetic field intensity. Also, as shown in FIG. 11, when an inflection point where a change in the magnetic field intensity of the permanent magnet 23 becomes gentle is set to be a predetermined lower limit value, a portion to be magnetized with the magnetic field intensity larger than the desired lower limit value exceeds 90% and reaches about 95%, and magnetization can be performed for entire permanent magnet 23 with sufficient magnetic force.

[Countermeasures for Heat-Generation of Magnetization Apparatus]

For the magnetization apparatus 30 according to the present embodiment, countermeasures for heat generation when magnetization is performed are made for the major magnetization part 30*a* and the lower auxiliary magnetization part 30*b* in the apparatus body 31, and the upper auxiliary magnetization part 30*c* in the apparatus upper side part 41.

With reference to FIG. 7, the major magnetization part 30*a* and the lower side auxiliary magnetization part 30*b* of the apparatus body 31 will be described. Firstly, the radially-outside main yoke 32 is configured of a laminated steel-sheet A11 in which a plurality of electromagnetic steel-sheet 32*x* are laminated in the vertical direction. In the whole radially outside main yoke 32 configured of the laminated steel plate A11, occurrence of eddy current when the magnetization flux flows is suppressed. The radially outside main yoke 32 can readily be produced by laminating the same electromagnetic steel plate 32*x*. A slit 32*c* is formed on a tip end surface 32*a* of each magnetization opposing convex part 32*a* of the radially-outside main yoke 32, which extends in a direction crossing the eddy current generated by the magnetization flux. The slit 32*c* has a lattice shape in which a plurality of first slit parts extending in the vertical direction and a plurality of second slit parts extending in the circumferential direction orthogonally crossing the first slit parts are mixed. For the tip end surface 32*al* of each magnetization opposing part 32*a*, occurrence of eddy current is suppressed.

For the lower side auxiliary yoke 34 of the lower side auxiliary magnetization part 30*b*, substantially the whole part thereof excluding the lower side insertion protrusion 34*d* and the contact part 34*c* is made configured of a dust core A12. The dust core A12 is configured by compressing and forming a magnetic metal powder having an insulation resin coating to have higher electric resistance thereof. In the whole part of the lower auxiliary yoke 34 composed of the dust core A12, occurrence of eddy current when the magnetization flux flows is suppressed. The lower side auxiliary yoke 34 excluding the lower side insertion protrusion 34*d* and the contact part 34*c* can readily be produced with a forming of the dust core A12 due to its shape, compared to the lamination of the steel-plate. The one end of the lower side coupling part 34*a* of the lower side auxiliary yoke 34 and the lower surface of the annular coupling part 32*b* of the radially-outside main yoke 32 are integrally fixed with an adhesive or the like and magnetically coupled with each other.

A portion including the lower side insertion protrusion 34*d* and the contact part 34*c* is configured of a steel material A13 made of magnetic metal. A slit 34*e* is formed at the outer peripheral surface 34*d*1 of the lower side insertion protrusion 34*d*. The slit 34*e* is formed in a direction crossing eddy current generated by magnetization flux. The slit 34*e* has a lattice shape in which a plurality of vertical slit parts extending in the vertical direction and a plurality of circumferential slit parts orthogonally crossing the vertical slit parts are mixed (illustration is omitted since the slits are similar to the above-described slit 32*c*). At the outer peripheral surface 34*d* of the lower side insertion protrusion 34*d*, occurrence of eddy current is suppressed. Further, since it is configured of the steel material A13, rigidity of the lower side insertion protrusion 34*d* can be higher. Also, the contact part 34*c* capable of contacting with the rotor 20 is configured to have higher rigidity. In other words, the lower auxiliary yoke 34 other than the lower side insertion protrusion part 34*d* and the contact part 34*c* which require high rigidity, is produced by the dust core A12 so as to effectively suppress occurrence of eddy current.

For the upper side auxiliary magnetization part 30*b* of the apparatus upper side part 41, substantially whole part of the upper auxiliary yoke 42 excluding the upper side insertion protrusion 42*d*, the contact part 42*c* and one end of the upper side coupling part 42*a* is configured of dust core A14. In the whole part of the upper side auxiliary yoke 42 composed of the dust core A14, occurrence of eddy current when the magnetization flux flows is suppressed. Also, for the upper side auxiliary yoke 42, similar to the above-described lower side auxiliary yoke 34, the upper side auxiliary yoke 42 can readily be produced with a forming of the dust core A14 due to its shape, compared to the lamination of the steel-plate.

A portion including the upper side insertion protrusion 42*d* and the contact part 42*c* is configured of a steel material A15 made of magnetic metal. A slit 42*e* is formed at the outer peripheral surface 42*d*1 of the upper side insertion protrusion 42*d*. The slit 42*e* is configured similar to the slit 34*e* of the above-described lower side auxiliary yoke 34 and also occurrence of eddy current is suppressed at the outer peripheral surface 42*d*1. Further, since it is configured of the steel material A15, rigidity of the upper side insertion protrusion 42*d* can be higher. Also, the contact part 42*c* capable of contacting with the rotor 20 is configured to have higher rigidity.

When the apparatus upper side part 41 contacts or separates to/from the apparatus body 31, the one end of the upper side coupling part 42*a* of the upper side auxiliary yoke 42 comes into contact with the upper surface of the annular coupling part 32*b* of the radially-outside main yoke 32 to be magnetically coupled with each other. One steel plate A16 is attached to each one end of a plurality of upper side coupling part 42*a*. The steel plate A16 is configured of, for example, a steel plate similar to the electromagnetic steel plate 32*x* that constitutes the above-described radially outside main yoke 32. For the upper side coupling part 42*b* that contacts with the radially outside main yoke 32, the rigidity of the one end thereof is configured to be higher. In other words, the upper side insertion protrusion 42*d* and the contact part 42*c* necessary for ensuring the rigidity and also the upper side auxiliary yoke 42 excluding the one end of the upper side coupling part 42*a* is configured of a dust core A14. Hence, also for the upper side auxiliary yoke 42, occurrence of eddy current is effectively suppressed. Thus, for the main magnetization part 30*a* of the magnetization apparatus 30, the lower side auxiliary magnetization part 30*b* and the upper side auxiliary magnetization part 30*c* according to the present embodiment, occurrence of eddy current is suppressed being suitable for respective portions thereof. Specifically, heat generation is effectively suppressed at respective magnetic paths when magnetization flux flows through the main yoke 32 and the auxiliary yokes 34 and 42 that constitute respective magnetic paths of the magnetization apparatus 30.

Effects and Advantages of the Present Embodiment (1-1) According to the magnetization for the rotor 20 to be magnetized, with a conventional magnetization in which magnetization is applied from radially outside of the rotor 20, there is a concern that the magnetization flux is unlikely to reach the bending part 23*b* of the permanent magnet 23 positioned in a radially inside part and a vicinity of the bending part 23*b*. The magnetization apparatus 40 is provided with, as a yoke part that constitutes the magnetic paths allowing the magnetization flux to flow through the permanent magnet 23 inside the rotor 20, auxiliary yokes 34 and 42 of the auxiliary magnetization parts 30*b* and 30*c* arranged in both sides in the axial direction of the rotor 20, in addition to the radially outside main yoke 32 of the main magnetization part 30*a*. The insertion protrusion 34*d* and 42*d* provided at a part of the auxiliary yokes 34 and 42 are caused to be inserted into the shaft insertion hole 22*b* of the rotor 20, whereby sufficient magnetization flux can be supplied to the bending part 23*b* of the permanent magnet 23 where the magnetization flux is difficult to be reached. In other words, sufficient magnetization can be accomplished for entire permanent magnet 23. Note that the radially outside main yoke 32 corresponds to a first yoke, and the auxiliary yokes 34 and 42 correspond to a second yoke.

(1-2) The radially outside main yoke 32 of the main magnetization part 30*a* is configured of the laminated steel plate A11, and the slit 32*c* is formed at the tip end surface 32*al* of the magnetization opposing convex part 32*a*. Further, the auxiliary yokes 34 and 42 of the auxiliary magnetization parts 30*b* and 30*c* are configured of the dust cores A12 and A14. In the respective magnetic paths of the magnetization apparatus 30, occurrence of eddy current generated by the magnetization flux is suppressed. Hence, heat generation when magnetization is performed by the magnetization apparatus 30 can be suppressed, which maintains the magnetization for a long period of time.

(1-3) The apparatus upper side part 41 moves relative to the apparatus body 31 and one end of the upper side auxiliary yoke 42 comes into contact with the upper surface of the annular coupling part 32*b* of the radially outside main yoke 32. The steel plate A16 is attached to the contact portion of the upper side auxiliary yoke 42 so as to enhance the rigidity thereof. Specifically, the main part of the upper side auxiliary yoke 42 is configured of the dust core A14 having a function of suppressing eddy current. Hence, use of the dust core A14 makes it possible to avoid wear and chipping during contact while suppressing heat generation during the magnetization.

(1-4) The insertion protrusions 34*d* and 42*f* of the auxiliary yokes 34 and 42 are configured of the steel plates A13 and A15, to thereby enhance the rigidity. The insertion protrusions 34*d* and 42*d* form the slits 34*e* and 42*e* on the outer peripheral surfaces 34*d*1 and 42*d*1 as an opposing surface that opposes to the inner peripheral surface of the shaft insertion hole of the rotor 20. Hence, occurrence of eddy current at the slits 34*e* and 42*e* is suppressed while preventing the insertion protrusions 34*d* and 42*d* having a long rod shape from being broken and protecting the rotor 20 from being worn against the inner peripheral surface of the shaft insertion hole 22*b*.

Modifications

The present embodiment may be modified in the following manner. The present embodiment and the following modifications may be mutually combined as long as no technical inconsistency is present.

In the insertion protrusions 34*d* and 42*d* of the respective auxiliary yokes 34 and 42, as indicated by the dotted line and reference symbols with parenthesis, tapered parts 34*x* and 42*x* may be provided at the tip ends thereof such that each of the insertion protrusions 34*d* and 42*d* has a tapered shape towards the tip end thereof. With such a configuration, respective insertion parts 34*d* and 42*d* can readily be inserted into the shaft insertion hole 22*b* of the rotor 20 to be magnetized. Further, even if the tapered part 22*x* having an extended shape in the opening is provided in the shaft insertion hole 22*b* of the rotor 20, respective insertion protrusions 34*d* and 42*d* can readily be inserted into the shaft insertion hole 22*b*.

The insertion protrusions 34*d* and 42*d* having different protrusion lengths are provided to the respective auxiliary yokes 34 and 42. However, the protrusion lengths of the respective insertion protrusions 34*d* and 42*b* may be the same. Further, the protrusion length L2 of the upper side insertion protrusion 42*d* may be set to be 0, that is, only the lower side insertion protrusion 34*d* is present, which is inserted from one end of the rotor 20 in the axial direction to the other end thereof.

The coil supporting part 39 covers a portion around the magnetization main coil 33. However, the coil supporting part 39 may be omitted. The coil supporting parts 38 and 46 cover around respective magnetization auxiliary coils 35 and 43, and respective regulation members 36, 37, 44 and 45 are provided outside the coil supporting parts 38 and 46, however, any or all of them may be omitted.

The upper side auxiliary yoke 42 and the lower side auxiliary yoke 34, and the magnetization upper side auxiliary coil 43 and the magnetization lower side auxiliary coil 35 are symmetrically arranged as a pair between one side and the other side in the axial direction of the rotor 20 to be magnetized. However, they may be arranged at only one side in the axial direction. In this case, as described above, the insertion protrusions 34*d* and 42*d* may be inserted from one end in the axial direction of the rotor 20 to the other end thereof.

The magnetization main coil 33 is disposed at the opposing convex part 32*a* of the radially-outside main yoke 32, and the magnetization auxiliary coils 35 and 43 are disposed at the respective collection parts 34*b* and 42*b*. However, disposition of the magnetization coil is not limited this. For example, the respective auxiliary coils 35 and 43 may be provided to be wound around the coupling parts 34*a* and 42*a*, respectively. In this case, like the above-described embodiments, respective collection parts 34*b* and 42*b* and the respective insertion protrusions 34*d* and 42*d* may be commonly utilized, however the magnetic path may be independently provided from the respective coupling parts 34*a* and 42*a* to the respective insertion protrusions 34*d* and 42*d*. Further, the mail coil 33 may be appropriately disposed at a portion other than the opposing convex part 32*a*. The magnetization coil may be provided as a shared single coil without separating into the main coil 33 and the respective auxiliary coils 35 and 43.

The number of rotor 20 to be magnetized is one as shown in FIG. 4 and the like. However, a plurality of rotors 20 may be provided such that the rotors are stacked in the axial direction to allow the plurality of rotors to be simultaneously magnetized. Thus, when the plurality of rotors are simultaneously magnetized, productivity of the rotor 20 can be improved.

The magnetization is applied to the rotor 20 of which the size corresponds to a space where the rotor of the magnetization apparatus 30 is disposed. However, in the case where the size of the rotor to be magnetized is smaller in the axial direction or the radial direction, a spacer may be used to occupy a gap produced by the smaller space where the rotor is disposed. The spacer may preferably be produced with a magnetic metal material which is unlikely to influence the flow of the magnetization flux.

The magnetization apparatus 30 is configured such that the apparatus upper side part 41 is disposed in the upper side relative to the apparatus body 31. However, the arrangement of the magnetization apparatus 30 is not limited to this configuration. For example, the apparatus body 31 and the apparatus upper side part 41 may be arranged in an inclination direction or a horizontal direction other than the vertical direction. Further, the apparatus upper side part 41 side is not required to be moved, but the apparatus upper side part 41 and the apparatus body 31 may be relatively moved.

As a countermeasure of heat generation of the magnetization apparatus 30 according to the present embodiment, that is, a countermeasure of suppressing eddy current, as shown in FIG. 17, the radially outside main yoke 32 is configured of the laminated steel plate A11, and the slit 32*c* is provided at the tip end surface 32*a*1 of the magnetization opposing convex part 32*a*. However, this configuration may be appropriately modified such that the radially outside main yoke 32 is configured of dust core for example. Further, the radially outside main yoke 32 may be produced from a steel plate and a slit may be provided on an end face thereof where the magnetization flux flows. Further, the respective auxiliary yokes 34 and 42 may be configured of a laminated steel plate. Also, when using a dust core, the outer surface may be covered by a magnetic metal cover to be protected.

Second Embodiment

Figure 12:
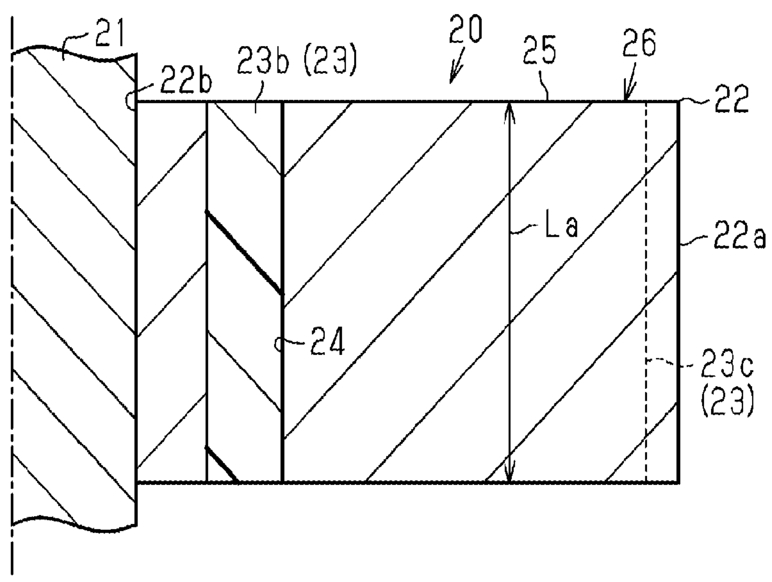
FIG. 12 is a diagram showing a cross-sectional view of an example of a rotor to which a magnetization apparatus of a second embodiment magnetizes.
Figure 13:
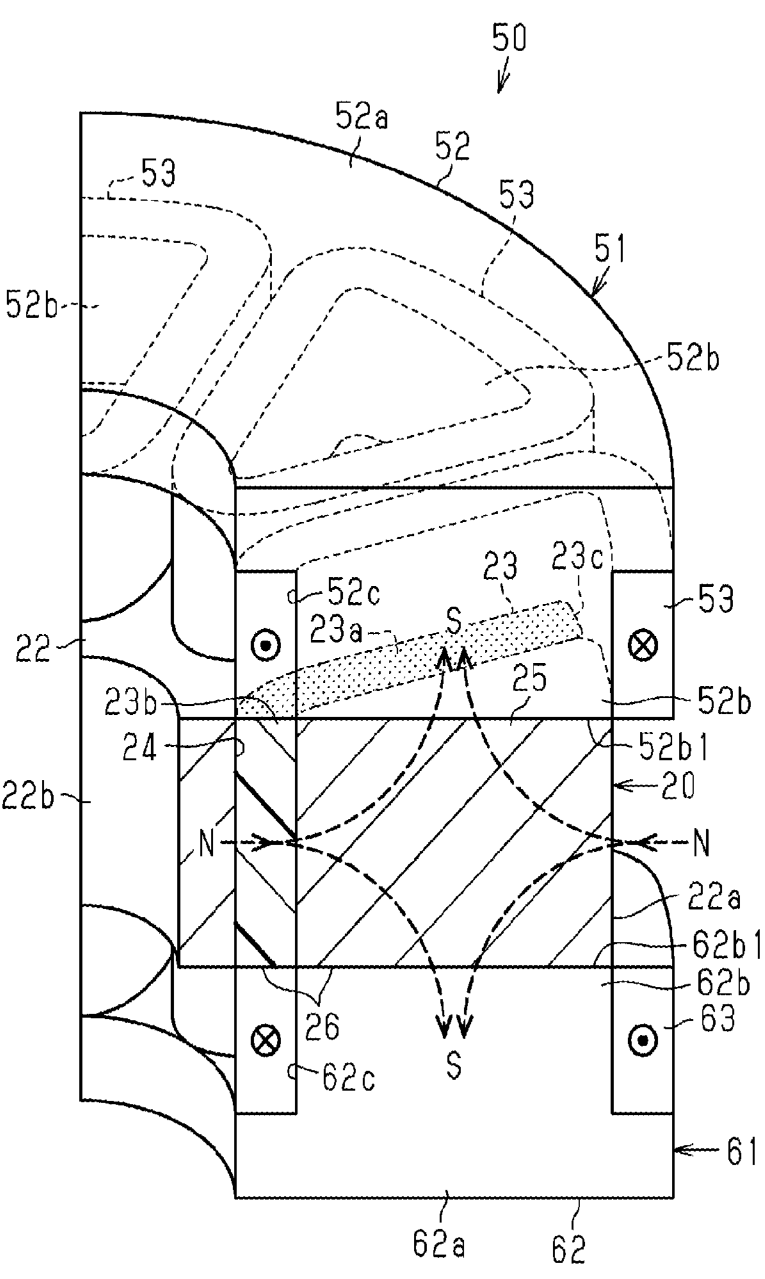
FIG. 13 is an explanatory diagram showing an overall configuration of a magnetization apparatus according to the second embodiment.
Figure 14:
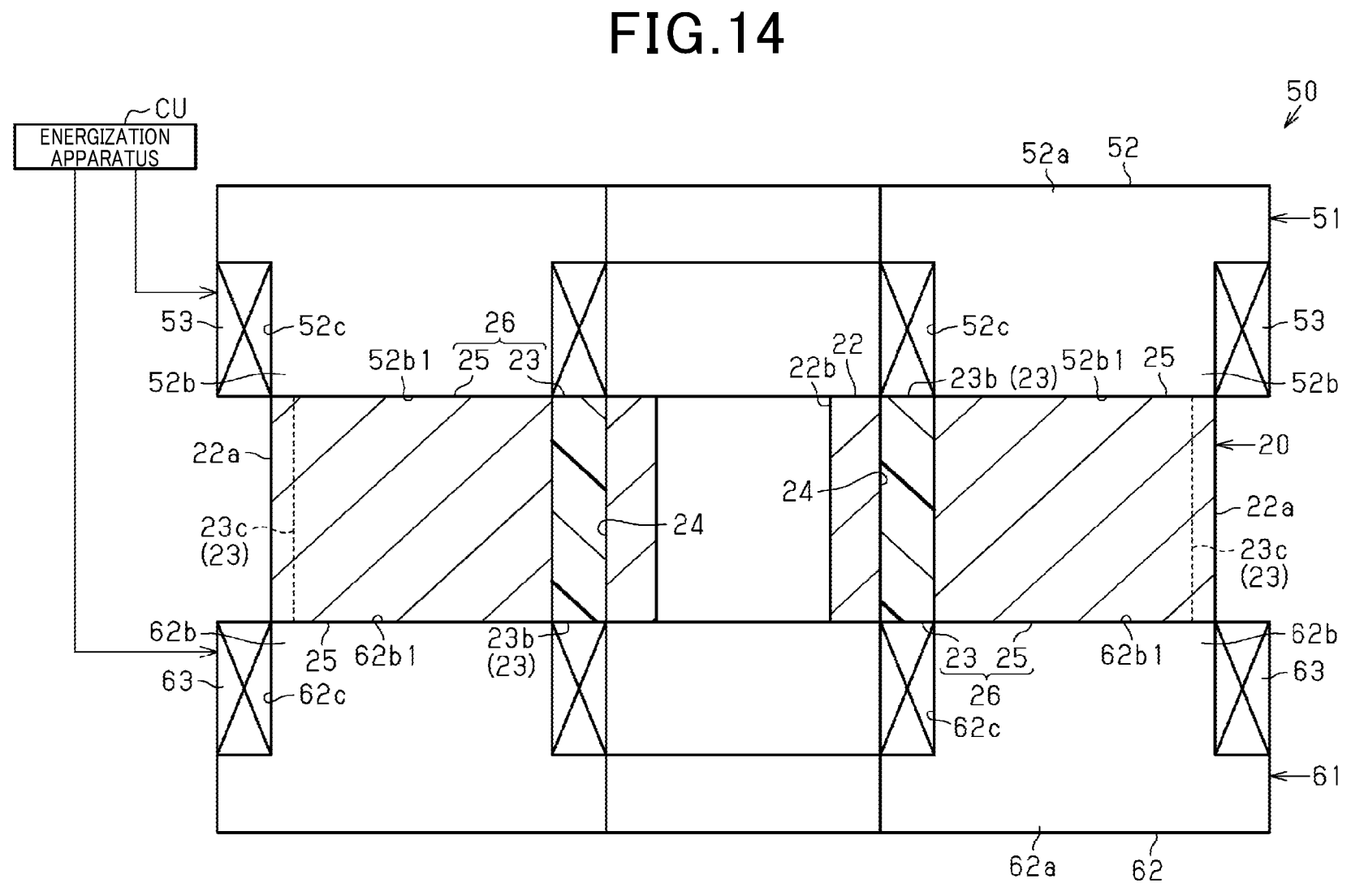
Figure 15:
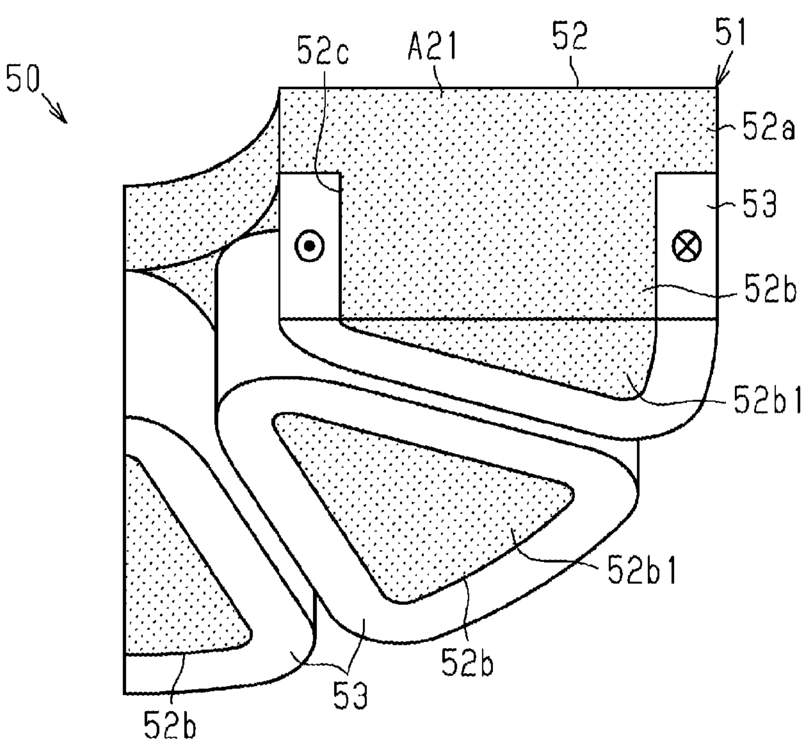
FIG. 15 is an explanatory diagram showing an overall configuration of a magnetization apparatus according to the second embodiment.
Figure 15:
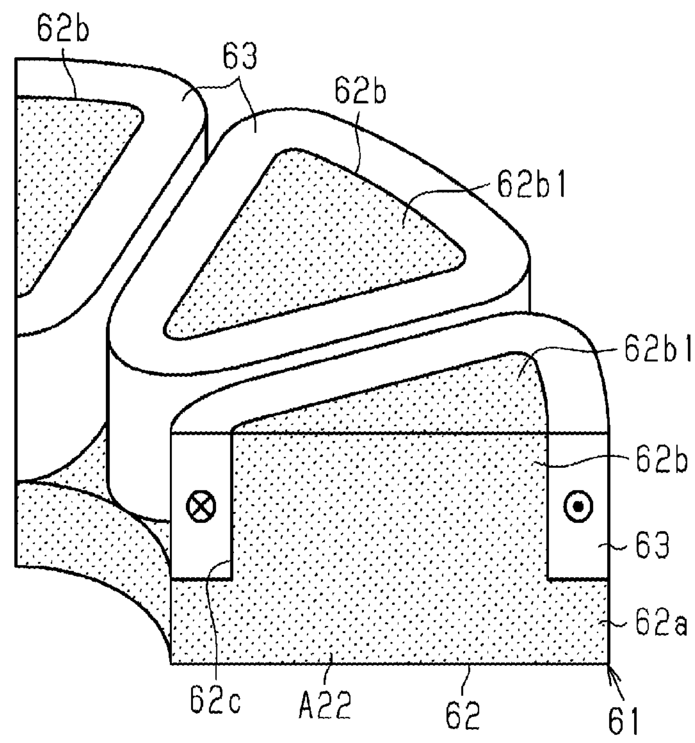

Hereinafter, a second embodiment of a manufacturing apparatus of a rotor will be described. For the rotor 20 to be magnetized according to the present embodiment as shown in FIG. 12, the length in the axial direction (axial length La is set to be shorter, but other portions are the same as those in the above-described first embodiment. The magnetization apparatus 50 according to the present embodiment shown in FIGS. 13 to 15 is configured to be especially useful for magnetizing the rotor 20 having shorter axial length La shown in FIG. 12. For the magnetization apparatus 30 according to the above-described first embodiment shown in FIG. 4 or the like, the axial length La of the rotor 20 to be magnetized is not a matter of concern.

Next, a configuration of a magnetization apparatus 50 according to the present embodiment and a magnetization method thereof will be described.

[Configuration of Magnetization Apparatus]

With reference to FIGS. 13 to 15, a magnetization apparatus according to the present embodiment will be described. Note that hatching is appropriately omitted for cross-sectional part shown in FIGS. 13 to 15.

As shown in FIGS. 13 to 15, the magnetization apparatus 50 is provided with the apparatus upper side part 51 and the apparatus lower side part 61. The magnetization apparatus 50 is configured such that the apparatus upper side part 51 is detachable and attachable to the apparatus lower side body 61 so as to install or remove the rotor 20 to be magnetized.

In this case, either one or both of the apparatus upper side part 51 and the apparatus lower side part 61 performs contact or separate operation.

The apparatus upper side part 51 is provided with an upper side magnetization yoke 52 made of magnetic metal and a magnetization coil 53 to be integrally attached to the upper side magnetization yoke 52. The upper side magnetization yoke 52 is provided with an annular plate shaped case part 52*a* having a diameter slightly larger than that of the rotor 20 to be magnetized and eight opposing convex part 52*b* positioned at the lower surface of the base part 52*a* at the same intervals in the circumferential direction. The respective opposing convex parts 52*b* each contacts with or closely opposes to the upper side surface of the rotor to be magnetized, and are provided corresponding to respective rotor magnet pole parts 26. For the respective opposing convex parts 52*b*, a magnetization coil 53 is attached to each outer peripheral surface 52*c* as being wound therearound.

The respective opposing convex parts 52*b* has a shape similar to the outer side core part 25 (see FIG. 2) surrounded by the permanent magnets 23 having a V-folding shape at respective rotor magnetic pole parts 26. Specifically, the respective opposing convex pars 52*b* has a substantially triangle shape in which one apex part is oriented towards the center part of the rotor 20. The outer peripheral surface 52*c* of each opposing convex part 52*b* is configured to have a circumferential surface shape which is substantially the same as a magnet surface inside the V-shaped part of the permanent magnet 23 and the outer peripheral surface 22*a* of the rotor core 22. Thus, main magnetization flux flowing from/to the respective opposing convex part 52 does not directly flow through the end face of the permanent magnet 23 in the axial direction but flows from the outer side core part 25 and through the magnet surface of the permanent magnet 23. The main magnetization flux magnetizes the permanent magnet 23 in the thickness direction Wm (see FIG. 2).

The magnetization coil 53 is provided, eight in number which is the same as that of the opposing convex parts 52*b*. The respective magnetization coils 53 has a winding state in which winding direction becomes alternately opposite in the circumferential direction. Then, when the energization apparatus CU energizes respective magnetization coils 53, the magnetization coils 53 are excited such that polarities of respective opposing convex parts 52*b* wound around the respective magnetization coils 53 are alternately different in the circumferential direction. The respective permanent magnets 23 magnetized by the respective magnetization coils 53 and the respective opposing convex parts 52*b* are alternately different polarities in the circumferential direction of the rotor 20.

The apparatus upper side part 51 is thus configured. Also, the apparatus lower side part 61 is configured similar to the apparatus upper side part 51. That is, as shown in FIGS. 13 to 15, the apparatus lower side part 61 is provided with a lower magnetization yoke 62 having eight opposing convex parts 62*b* on the upper surface of the base part 62*a*, and eight magnetization coils 63. For the respective opposing convex parts 62*b*, respective magnetization coils 63 are attached to the respective outer peripheral surfaces 62*c* as being wound therearound. The respective magnetization coils 63 are alternately wound around the respective magnetization coils 63 to be in opposite direction. The respective magnetization coils 63 are energized by the energization apparatus CU.

The apparatus upper side part 51 and the apparatus lower side part 61 thus configured are disposed opposing with each with respect to the axial direction of the rotor 20 to be magnetized. The respective opposing convex parts 52*b* and 62*b* of the apparatus upper side part 51 and the apparatus lower side part 61 have a positional relationship where both of the opposing convex parts 52*b* and 62*b* oppose with each other with respect to the axial direction of the rotor 20. Then, in the energization by the energization apparatus CU, the respective opposing convex parts 52*b* and 62*b* which oppose with respect to the axial direction and the respective magnetization coils 53 and 63 in the apparatus upper side part 51 and the apparatus lower side part 61 are excited with the same polarity.

[Magnetization Method Using Magnetization Apparatus]

The magnetization apparatus 50 configured as described above is utilized. Firstly, the rotor 20 having unmagnetized permanent magnet 23 are disposed between the apparatus upper side part 51 and the apparatus lower side part 61 during an open state where the apparatus upper side part 51 and the apparatus lower side part 61 are mutually separated. After disposing the rotor 20 to be magnetized, the apparatus upper side part 51 and the apparatus lower side part 61 are relatively close to each other, and the tip end surfaces 52*b*1 and 62*b*1 of the opposing convex parts 52*b* and 62*b* which are the same polarity when being magnetized come into contact or closely oppose to one side and the other side of the rotor 20 in the axial direction, that is, the upper side surface and the lower side surface Then energization apparatus CU energizes the respective magnetization coils 53 and 63 of the apparatus upper side part 51 and the apparatus lower side part 61. The respective opposing convex parts 52*b* and 62*b* of the apparatus upper side part 51 and the apparatus lower side part 61 are excited by an energization of the respective magnetization coils 53 and 63 such that polarities thereof are alternately different in the circumferential direction. Further, the respective opposing convex parts 52*b* and 62*b* opposed with each other of the apparatus upper side part 51 and the apparatus lower side part 61 are excited to have the same polarity with the energization to the respective magnetization coils 53 and 63.

As shown in FIG. 13, the respective opposing convex parts 52*b* and 62*b* opposing with each other of the apparatus upper side part 51 and the apparatus lower side part 61 are excited at the same polarity, for example an S pole. Then, in the outside core part 25, the magnetization flux flowing along a direction orthogonal to the axial direction including a thickness Wm direction of the permanent magnet 23 is converted into a flux flowing towards respective opposing convex parts 52*b* and 62*b* in both sides in the axial direction. Thus, the permanent magnet 23 is magnetized such that a magnetic surface side part inside the V-shaped part is an N pole. When the respective opposing convex parts 52*b* and 62*b* are magnetized to be N-poles, although illustration is omitted, in the outer side core part 25, the magnetization flux flowing from respective opposing convex parts 52*b* and 62*b* along the axial direction is converted into a flux flowing along a direction orthogonal to the axial direction including a thickness Wm direction of the permanent magnet 23.

Further, respective opposing convex parts 52*b* and 62*b* have a shape corresponding to the outside core part 25 surrounded by the respective permanent magnets 23 having V-folding shape. Hence, the magnetization flux flowing from/to the respective opposing convex parts 52*b* and 62*b* does not directly flow through the end face of the permanent magnet 23 in the axial direction, a direction of the magnetic flux is appropriately converted to a direction orthogonal to the axial direction from the axial direction the outside core part 25 in the outside core part, but flows through the magnet surface inside the V-shaped part of the permanent magnet 23. In other words, the permanent magnet 23 is readily to be magnetized in the thickness Wm direction (see FIG. 2).

Although the permanent magnet 23 having a substantially V-folding part according to the present embodiment is utilized, the magnetization apparatus 50 disposed in the axial direction of the rotor 20 is able to supply an appropriate magnetization flux entirely from the radially outside end part 23*c* to the bending part 23*b* in the radially inside part. That is, effective magnetization can be performed to entire permanent magnets 23. In particular, it is more useful for the permanent magnet 23 according to the present embodiment to have a deep folding shape in which the embedded depth Lm is larger than the magnet pole pitch Lp.

Assuming that a conventional magnetization method for magnetizing from the radially outside part of the rotor 20 is utilized for the configuration of the present embodiment having a deep folding shape, magnetic force is likely to be weaker at the bending part 23*b* and its vicinity of the permanent magnet 23. Moreover, as shown in FIG. 16, the magnetic force is weakest at the center part 23*d* in the vertical direction of the bending part 23*b* of the permanent magnet.

However, according to the permanent magnet 23 magnetized using the magnetization method of the present embodiment, as shown in FIG. 16, the bending part 23*b* and its vicinity part can be magnetized with sufficient intensity of the magnetic field larger than a desired lower limit value. Even for the center part 23*d* in the vertical direction of the bending part 23*b* which is difficult to magnetize in the permanent magnet 23, magnetization can be accomplished with sufficient intensity of the magnetic field larger than a desired lower limit value. Thus, a ratio of an amount of region to be magnetized to that of the entire permanent magnet 23 of the present embodiment exceeds 90% to be about 95%. Hence, entire permanent magnet 23 can be magnetized with sufficient intensity of the magnet force.

[Countermeasures for Heat-Generation of Magnetization Apparatus]

Countermeasures for heat generation when magnetization is performed are made for the apparatus upper side part 51 and the apparatus lower side part 61.

As shown in FIG. 15, the upper side magnetization yoke 52 of the apparatus upper side part 51 and the lower side magnetization yoke 62 of the apparatus lower side part 61 are configured of dust core A21 and A22, respectively. In the whole upper magnetization yoke 52 and the lower side magnetization yoke 62 configured of the dust cores A21 and A22, similar to the respective auxiliary yokes 34 and 42 configured of the duct core A12 and A14 according to the above-described first embodiment, occurrence of eddy current when the magnetization flux flows is suppressed. That is, when the magnetization flux flows through the magnetization yokes 52 and 62 which constitute respective magnetic paths of the magnetization apparatus 50, heat-generation is effectively suppressed at respective magnetic paths. The upper side magnetization yoke 52 and the lower side magnetization yoke 62, can readily be produced with a forming of the dust cores A21 and A22 due to its shape, compared to the lamination of the steel-plate. Accordingly, forming method is utilized to produce the yoke according to the present embodiment.

Effects and Advantages of the Present Embodiment

Effects and advantages of the present embodiment will be described.

(2-1) The magnetization apparatus 50 is provided with, as a yoke part that constitutes the magnetic path for supplying magnetization flux to the permanent magnet 23 inside the rotor 20, the upper side magnetization yoke 52 of the apparatus upper side part 51 and the lower side magnetization yoke 62 of the apparatus lower side part 61 which are disposed at both sides of the rotor 20 in the axial direction. The opposing convex parts 52*b* and 62*b* of the magnetization yokes 52 and 62 are caused to contact or approach closely to the outer side core part 25, and then magnetization flux is caused to flow with the same polarity from both sides in the axial direction, whereby sufficient magnetization flux can be supplied to the bending part 23*b* and the like of the permanent magnet 23 to which magnetization flux is unlikely to be reached. In other words, sufficient magnetization can be accomplished for the entire permanent magnet 23. Note that the upper side magnetization yoke 52 corresponds to the first yoke and the lower side magnetization yoke 62 corresponds to second yoke. The outer side core part corresponds to a part of the rotor core.

(2-2) The magnetization yokes 52 and 62 of the apparatus upper side part 51 and the apparatus lower side part 61 are configured of dust cores A21 and A22. That is, eddy current which is likely to occur due to magnetization flux can be suppressed in the respective magnetic paths of the magnetization apparatus 50. Hence, heat generation when magnetization is performed by the magnetization apparatus 50 can be suppressed, which maintains the magnetization for a long period of time.

Modification Example

The present embodiment may be modified in the following manner. The present embodiment and the following modification example can be mutually combined as long as configuration thereof are technically consistent.

The respective opposing convex parts 52*b* and 62*b* of the magnetization apparatus 50 are configured having a shape in which respective outer side core parts 25 are combined when viewing in the axial direction of the rotor. However, the shape of the opposing convex parts 52*b* and 62*b* may be partly the same as that of the outer side core parts 25 or may be different from that of the outer side core parts 25.

Although, illustration is omitted, an insertion protrusion similar to the above-described first embodiment may be provided at each center part of the upper side magnetization yoke 52 and the lower side magnetization yoke 62, and respective insertion protrusions may be inserted into the shaft insertion hole 22*b* of the center part of the rotor 20 to be magnetized, whereby magnetization is performed. Since the respective insertion protrusions are provided, a part of magnetization flux flows to the respective insertion protrusions in accordance with the excitation of the magnetization coils 53 and 63. Hence, the magnetization flux flowing through a radially inside part of the rotor 20 can be increased. Thus, the bending part 23*b* and its periphery of the permanent magnet 23 positioned in the radially inside part of the rotor 20 can be effectively magnetized.

In the case where the magnetization apparatus 50 magnetizes the rotor 20 having a longitudinal shape in the axial direction, the magnetization may be applied to the rotor 20 at each divided block having a length La in the axial direction where the permanent magnet 23 can be sufficiently magnetized and a plurality of magnetized blocks are caused to be stacked to constitute the rotor 20 having a longitudinal shape in the axial direction.

The magnetization apparatus 50 is configured of the apparatus upper side part 51 disposed in the upper side thereof and the apparatus lower side part 61 disposed in the lower side thereof. However, the arrangement of the magnetization apparatus 50 is not limited to this configuration. The apparatus upper side part 51 and the apparatus lower side part 61 may be arranged in a horizontal direction or an inclination direction.

As a countermeasure of heat-generation of the magnetization apparatus 50 according to the present embodiment, that is, a countermeasure for suppressing eddy current, as shown in FIG. 18, the respective magnetization yokes 52 and 62 are configured of dust cores A12 and A14. However, the configuration may be appropriately modified. For example, the respective magnetization yokes 52 and 62 may be produced from steel material and a slit may be provided at the end face with which the magnetization flux flows, that is, tip end surfaces **52*b* and 62*b*1 of the respective opposing convex parts 52*b* and 62*b*. Further, respective magnetization yokes 52 and 62** may be configured of a laminated steel plate. Moreover, when using a dust core, the outer surface may be covered by a metal magnetic cover for protection.

In the present specification, description 'at least one of A and B' means 'only A, or only B, or both A and B'.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

CONCLUSION

The present disclosure is to provide a manufacturing apparatus of a rotor, capable of sufficiently magnetizing the entire permanent magnet embedded in a rotor core and suppressing heat generation of the apparatus during the magnetization.

A manufacturing apparatus of a rotor according to one aspect of the present disclosure is for a rotor having a permanent magnet provided in a state of being embedded in a magnet accommodating hole of a rotor core, the permanent magnet having a folding shape being convex towards a radially inside part. The manufacturing apparatus includes a magnetization apparatus that magnetizes the permanent magnet in the embedded state from outside the rotor. The magnetization apparatus is provided with a yoke part at least disposed in an axially outside part of the rotor, the yoke part constituting a magnetic path for supplying a magnetization flux to the permanent magnet. The yoke part is configured to include at least one of a dust core, a laminated steel plate, and a slit having a function of suppressing eddy current occurring due to the magnetization flux.

According to the above-described configuration, during a magnetization of the rotor in which the permanent magnet having a folding shape with a convex part towards radially inside is provided being embedded in the rotor core, the magnetization apparatus is provided with a yoke part at least disposed in an axially outside part of the rotor, the yoke part constituting a magnetic path for supplying a magnetization flux to the permanent magnet. With a magnetization from a radially outside of the rotor, sufficient magnetization flux can be supplied, by using the yoke part disposed in an axially outside of the rotor, to a bending part and its vicinity of the permanent magnet to which magnetization flux is unlikely to reach. That is, entire permanent magnet can be sufficiently magnetized. Further, the yoke part disposed in an axially outside of the rotor is configured to include at least one of a dust core, a laminated steel plate and a slit. With this configuration, eddy current occurring due to magnetization flux can be suppressed. Therefore, heat-generation during the magnetization process of the magnetization apparatus can be suppressed.

What is claimed is:

1. A manufacturing apparatus for a rotor having a permanent magnet provided in a state of being embedded inside a rotor core, the permanent magnet having a folding shape being convex towards a radially inside part, the manufacturing apparatus comprising:

a magnetization apparatus that magnetizes the permanent magnet in the embedded state from outside the rotor, wherein the magnetization apparatus is provided with a yoke part at least disposed in an axially outside part of the rotor, the yoke part constituting a magnetic path for supplying a magnetization flux to the permanent magnet, the yoke part includes at least one of a dust core, a laminated steel plate, and a slit having a function of suppressing eddy current occurring due to the magnetization flux, the magnetization apparatus is provided with, as the yoke part, a first yoke disposed in a radially outside of the rotor, a second yoke disposed in an axially outside of the rotor, magnetically coupled with the first yoke and having an insertion protrusion inserted into a shaft insertion hole of the rotor, and a magnetization coil provided on magnetic paths of the first yoke and the second yoke, and the magnetization apparatus is configured to cause, based on an energization of the magnetization coil, the magnetization flux to flow between the first yoke and the insertion protrusion of the second yoke which oppose each other in a radial direction of the rotor to magnetize the permanent magnet.

2. The manufacturing apparatus of the rotor according to claim 1, wherein the first yoke is configured mainly of the laminated steel plate; and the second yoke is configured mainly of the dust core.

3. The manufacturing apparatus of the rotor according to claim 2, wherein the second yoke moves relatively to the first yoke;

a steel plate is attached to a contact portion of the second yoke at which the second yoke contacts with the first yoke.

4. The manufacturing apparatus of the rotor according to claim 1, wherein the first yoke has an opposing surface that opposes an outer peripheral surface of the rotor; and the slit is formed on the opposing surface.

5. The manufacturing apparatus of the rotor according to claim 1, wherein the insertion protrusion of the second yoke is configured of a steel material, having an opposing surface that opposes an inner peripheral surface of the shaft insertion hole of the rotor; and the slit is formed on the opposing surface.

6. The manufacturing apparatus of the rotor according to claim 1, wherein the magnetization apparatus is provided with, as the yoke part, a first yoke disposed in one side of the rotor an axial direction thereof, a second yoke disposed in the other side of the rotor in the axial direction thereof and a magnetization coil provided to each of the first yoke and the second yoke; and the magnetization apparatus is configured to cause, based on an energization of the magnetization coil, the magnetization flux with the same polarity from both side in the axial direction of a portion of the rotor core positioned inside a folding shaped part of the permanent magnet to magnetize the permanent magnet.

7. The manufacturing apparatus of the rotor according to claim 6, wherein the first yoke and the second yoke are configured mainly of the dust core.

8. A method of manufacturing a rotor having a permanent magnet provided in a state of being embedded in a magnet accommodation hole of a rotor core, the permanent magnet having a folding shape being convex towards a radially inside part, the permanent magnet in the embedded state being magnetized from outside the rotor using a magnetization apparatus, wherein the magnetization apparatus is provided with, as a yoke part, a first yoke disposed in a radially outside of the rotor, a second yoke disposed in an axially outside of the rotor, magnetically coupled with the first yoke and having an insertion protrusion inserted into a shaft insertion hole of the rotor, and a magnetization coil provided on magnetic paths of the first yoke and the second yoke, the method comprising steps of:

an installation step of inserting an insertion portion of the second yoke into the shaft insertion hole of the rotor, disposing the rotor such that a radially inside part and a radially outside part of the rotor oppose the first yoke and the second yoke in a radial direction, and magnetically connecting the first yoke, the second yoke, and the rotor; and a magnetization step of causing magnetization flux to flow inside the rotor based on energization of the magnetization coil to magnetize the permanent magnet in the embedded state.

9. A rotor manufactured by a method of manufacturing a rotor having a permanent magnet provided in a state of being embedded in a magnet accommodation hole of a rotor core, the permanent magnet having a folding shape being convex towards a radially inside part, the permanent magnet in the embedded state being magnetized from outside the rotor using a magnetization apparatus, the magnetization apparatus being provided with, as a yoke part, a first yoke disposed in a radially outside of the rotor, a second yoke disposed in an axially outside of the rotor, magnetically coupled with the first yoke and having an insertion protrusion inserted into a shaft insertion hole of the rotor, and a magnetization coil provided on magnetic paths of the first yoke and the second yoke, the method comprising steps of:

an installation step of inserting an insertion portion of the second yoke into the shaft insertion hole of the rotor, disposing the rotor such that a radially inside part and a radially outside part of the rotor oppose the first yoke and the second yoke in a radial direction, and magnetically connecting the first yoke, the second yoke, and the rotor; and a magnetization step of causing magnetization flux to flow inside the rotor based on energization of the magnetization coil to magnetize the permanent magnet in the embedded state, wherein the rotor comprises:

a rotor core and a permanent magnet provided in a state of being embedded in a magnet accommodation hole of the rotor core, the permanent magnet having a folding shape being convex towards a radially inside part and being magnetized from outside the rotor using the magnetization apparatus, wherein a magnet pole pitch is defined as a distance on an outer peripheral surface of the rotor core between extending lines extending from inner side surfaces of respective straight parts of the permanent magnet, and an embedded depth is defined as a distance on a center line in a circumferential direction of the permanent magnet from the outer peripheral surface of the rotor core to an inner side surface of a bending portion of the permanent magnet, and the permanent magnet has a deep folding shape in which the embedded depth is larger than the magnet pole pitch.

* * * * *